United States Patent [19]
Clough et al.

[11] Patent Number: 5,756,207
[45] Date of Patent: *May 26, 1998

[54] TRANSITION METAL OXIDE COATED SUBSTRATES

[75] Inventors: Thomas J. Clough, Santa Monica; Victor L. Grosvenor, Topanga; Naum Pinsky, Thousand Oaks, all of Calif.

[73] Assignee: Ensci Inc., Pismo Beach, Calif.

[*] Notice: The term of this patent shall not extend beyond the expiration date of Pat. No. 5,407,743.

[21] Appl. No.: 470,259

[22] Filed: Jun. 6, 1995

Related U.S. Application Data

[62] Division of Ser. No. 400,283, Mar. 2, 1995, Pat. No. 5,603,983, which is a continuation of Ser. No. 210,075, Mar. 17, 1994, abandoned, which is a continuation of Ser. No. 105,468, Aug. 10, 1993, abandoned, which is a continuation of Ser. No. 839,786, Feb. 21, 1992, abandoned, which is a continuation-in-part of Ser. No. 770,557, Oct. 3, 1991, abandoned, Ser. No. 743,719, Aug. 12, 1991, Pat. No. 5,279,852, Ser. No. 743,738, Aug. 12, 1991, Pat. No. 5,306,522, and Ser. No. 743,827, Aug. 12, 1991, Pat. No. 5,290,589, each is a continuation-in-part of Ser. No.621,660, Dec. 3, 1990, Pat. No. 5,204,140, Ser. No. 348,789, May 8, 1989, Pat. No. 5,167,820, Ser. No. 348,788, May 8, 1989, Pat. No. 5,039,845, Ser. No. 348,787, May 8, 1989, and Ser. No. 348,786, May 8, 1989, each is a continuation-in-part of Ser. No.272,539, Nov. 17, 1988, and Ser. No. 272,517, Nov. 17, 1988, each is a continuation-in-part of Ser. No.82,277, Aug. 6, 1987, Pat. No. 4,787,125, which is a division of Ser. No. 843,047, Mar. 24, 1986, Pat. No. 4,713,306.

[51] Int. Cl.$^6$ ..................................................... B32B 5/16
[52] U.S. Cl. ........................... 428/375; 428/379; 428/388; 428/389; 428/403; 428/701
[58] Field of Search .......................... 428/357, 375, 428/379, 388, 389, 402, 403, 701, 702

[56] References Cited

U.S. PATENT DOCUMENTS

| | | | |
|---|---|---|---|
| 2,564,707 | 5/1951 | Mochel | 428/432 |
| 3,004,875 | 10/1961 | Lytle | 427/110 |
| 3,005,731 | 10/1961 | Payne | 427/108 |
| 3,367,872 | 2/1968 | Martin et al. | 252/74 |
| 3,385,793 | 5/1968 | Klass et al. | 252/75 |

(List continued on next page.)

FOREIGN PATENT DOCUMENTS

| | | |
|---|---|---|
| 0172563 | 2/1986 | European Pat. Off. . |
| 863970 | 4/1941 | France . |
| 995222 | 11/1951 | France . |
| 2132440 | 11/1972 | France . |
| 5300987 | 7/1976 | Japan . |
| 1572333 | 7/1980 | United Kingdom . |
| 2199336 | of 1987 | United Kingdom . |

OTHER PUBLICATIONS

"Electroless Deposition of $SnO_2$ and Antimony Doped $SnO_2$ Films," D. Raviendra et al. Phys Chem Colids Vol45 No. 8, pp. 945–950, 1985 USA.

"Sn(Sb)–Oxide Sol-Gel Coatings on Glass," C.J.R. Gonzalez–Oliver et al, J Non–Crystalline Solids 82, pp. 400–410, 1986, Amsterdam.

"Physical Properties of Tin Oxide Films Deposited by Oxidation of $SnCl_2$," N.S. Murty et al, Thin Solid Films 92, pp. 347–354, 1982, The Netherlands.

"Tin Dioxide Gas Sensors," Part 1, J.F. McAleer et al, J. Chem Soc. Faraday Trans I, 83, pp. 1323–1346, 1987.

(List continued on next page.)

*Primary Examiner*—H. Thi Le
*Attorney, Agent, or Firm*—Frank J. Uxa

[57] ABSTRACT

Processes for coating substrates, in particular substrates including shielded surfaces, with transition metal oxide-containing coatings are disclosed. Such processes comprise contacting a substrate with a transition metal oxide precursor, preferably maintaining the precursor coated substrate at conditions to equilibrate the coating, and then oxidizing the precursor to form a substrate containing transition metal oxide. Also disclosed are substrates coated with transition metal oxide-containing coatings for use in various applications.

31 Claims, 3 Drawing Sheets

U.S. PATENT DOCUMENTS

| | | | |
|---|---|---|---|
| 3,544,361 | 12/1970 | Servais | 427/108 |
| 3,562,124 | 2/1971 | Leon | 106/84 |
| 3,562,127 | 2/1971 | Wooton et al. | 204/164 |
| 3,577,273 | 5/1971 | Soderberg | 427/108 |
| 3,713,884 | 1/1973 | Maley | 427/64 |
| 3,870,567 | 3/1975 | Palmer et al. | 156/167 |
| 3,890,429 | 6/1975 | Pytlewski | 423/395 |
| 3,932,694 | 1/1976 | Hamaguchi et al. | 428/432 |
| 3,959,565 | 5/1976 | Jordan et al. | 428/432 |
| 4,108,107 | 8/1978 | Scheuermann | 118/730 |
| 4,229,491 | 10/1980 | Dislich et al. | 427/160 |
| 4,240,882 | 12/1980 | Ang et al. | 205/340 |
| 4,258,080 | 3/1981 | Sonada et al. | 437/159 |
| 4,263,335 | 4/1981 | Wagner et al. | 427/483 |
| 4,297,420 | 10/1981 | Chenaux et al. | 429/217 |
| 4,326,017 | 4/1982 | Will | 429/228 |
| 4,336,282 | 6/1982 | Sato et al. | 427/125 |
| 4,349,369 | 9/1982 | Van Laethem et al. | 65/60.4 |
| 4,371,740 | 2/1983 | Clem | 136/256 |
| 4,451,542 | 5/1984 | Ishida et al. | 429/174 |
| 4,502,931 | 3/1985 | Asano et al. | 204/192.34 |
| 4,510,219 | 4/1985 | Rowlette | 429/212 |
| 4,535,315 | 8/1985 | Sakai | 338/34 |
| 4,539,268 | 9/1985 | Rowlette | 429/54 |
| 4,542,082 | 9/1985 | Rowlette | 429/210 |
| 4,547,443 | 10/1985 | Rowlette et al. | 429/217 |
| 4,606,941 | 8/1986 | Jenkin | 427/217 |
| 4,614,669 | 9/1986 | Yannopoulos | 437/236 |
| 4,664,935 | 5/1987 | Strahl | 204/192.1 |
| 4,681,777 | 7/1987 | Engelken et al. | 427/98 |
| 4,687,589 | 8/1987 | Block et al. | 252/73 |
| 4,713,306 | 12/1987 | Pinsky et al. | 429/218 |
| 4,744,914 | 5/1988 | Filisko et al. | 252/74 |
| 4,772,407 | 9/1988 | Carlson | 252/74 |
| 4,818,437 | 4/1989 | Wiley | 252/511 |
| 4,818,438 | 4/1989 | Wiley | 252/511 |
| 4,879,056 | 11/1989 | Filisko et al. | 252/74 |
| 5,326,633 | 7/1994 | Clough et al. | 428/288 |
| 5,348,797 | 9/1994 | Clough et al. | 428/283 |
| 5,352,517 | 10/1994 | Clough et al. | 428/357 |
| 5,407,743 | 4/1995 | Clough et al. | 428/357 |
| 5,494,701 | 2/1996 | Clough et al. | 427/126.3 |

OTHER PUBLICATIONS

"Tin Dioxide Gas Sensors," Part 2, J.F. McAleer et al, J. Chem Soc. Faraday Trans I, 83, pp. 441–457, 1988.

"The Catalyzed Conversion of Methane to Methanol at High Pressure" N. R. Hunter et al, Symp Hydrocarbon Oxidation, Amer Chem Soc, 1987.

A Review of Tin Oxide–Based Catalytic Systems: Preparation, Characterization and Catalytic Behavior.: G. B. Hoflund, NASA Conference Publication 2456, pp. 179–192, 1987.

"Sol–Gel Glass Research," technology Forecasts and Technology Surveys, pp. 5–7, 1982.

"High Selectivity of CVD $SnO_2/SiO_2$ Catalyst for Oxidative Dehydrogenation of Ethylbenzene," T. Hattori, et al, Prep of Catalysts IV, pp. 113–123, 1987.

"Electro Rheology," H. Block et al, J. Phys D. Appl. Phys 211 (1988), pp. 1661–1677.

"Measurements on thin–film high–$T_c$ superconductors," A. Kapitulnik, et al, IBM J. Res. Develop., vol. 33 No. 3, May 1989, pp. 252–261.

"USA: New Chemical Deposition Process Speeds Production of Thin–Film Superconductors," Engineering Digest Feb. 1990, pp. 11–14.

"Films of BSCCO superconductors prepared by spray pyrolysis of carboxylates," M. Schieber, et al, Cryogenica 1990 vol. 30 May, pp. 451–454.

"Fabrication and Evaluation of Superconducting Devices*," R. Babbitt, et al, Microwave Journal Apr. 1991, pp. 40–48.

"Comparison of Several CU(I) and CU(II) Precursors for the Sol–Gel Preparation of High $T_c$ Superconducting Metal Oxides," Mariquita A. Accibal, et al, Mat. Res. Soc. Symp. Proc. vol. 121 1988 Materials Research Society; pp. 401–406.

"Photo–Induced Catalytic Reactions of Alocohols on Zinc Oxide Suspensions in Cyclohexane:Oscillation in the Concentration of Hydrogen Peroxide Formed," J. C. Kuriacose, et al, Indian J: Chem., vol. 16A, Mar. 1978, pp. 254–256.

"Effect of Naphthalene, Phenanthrene & Fluorene on the Photoinduced Reaction of Benzhydrol, Benzyl AAlcohol & Isopropanol on Zinc Oxide," E. P. Yesodrharan, et al, Indian J. Chem., vol. 15B, Sep. 1977, pp. 844–846.

"Conversion of Isopropyl Alcohol to Acetone on Irradiated Zinc Oxide*," Joseph C. Kuriacose, et al, Journal of Catalysis 1, 498–507 (1962), pp. 498–507.

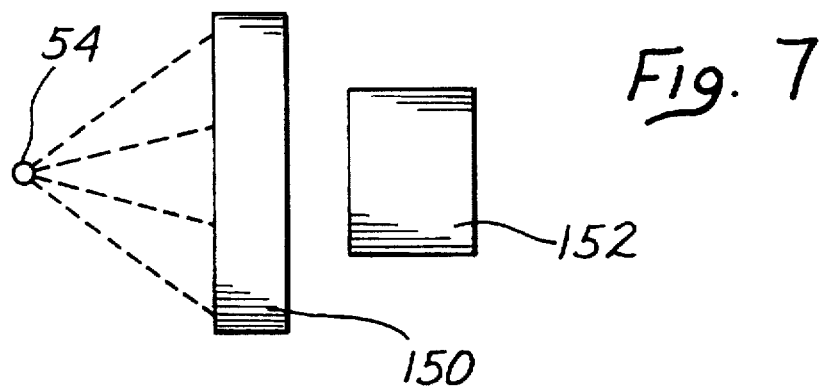
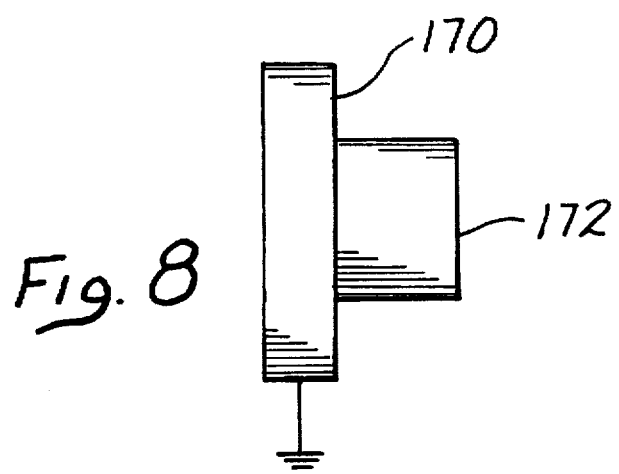

TRANSITION METAL OXIDE COATED SUBSTRATES

RELATED APPLICATIONS

This application is a division of application Ser. No. 08/400,283, filed Mar. 2, 1995, now U.S. Pat. No. 5,603,983, which application is a continuation of application Ser. No. 08/210,075 filed Mar. 17, 1994, now abandoned, which application is a continuation of application Ser. No. 08/105,468 filed Aug. 10, 1993, now abandoned, which application is a continuation of application Ser. No. 07/839,786 filed Feb. 21, 1992, now abandoned, which application is a continuation in part of application Ser. No. 770,557 filed Oct. 3, 1991, now abandoned, application Ser. Nos. 743,719, now U.S. Pat. No. 5,279,852, 743,738, now U.S. Pat. No. 5,306,522 and 743,827, now U.S. Pat. No. 5,290,589 each filed Aug. 12, 1991, which applications are a continuation in part of application Ser. No. 621,660, filed Dec. 3, 1990, now U.S. Pat. No. 5,204,140 which applications in turn are continuation-in-part applications of Ser. Nos. 348,789; 348,788 now U.S. Pat. Nos. 5,167,820; 5,039,845; 348,787 and 348,786 each filed May 8, 1989, each of which application is a continuation-in-part of application Ser. Nos. 272,517 and 272,539, each filed Nov. 17, 1988, each of which application in turn, is a continuation-in-part of application Ser. No. 082,277, filed Aug. 6, 1987 (now U.S. Pat. No. 4,787,125) which application, in turn, is a division of application Ser. No. 843,047, filed Mar. 24, 1986, now U.S. Pat. No. 4,713,306. Each of these earlier filed applications and these U.S. Patents is incorporated in its entirety herein by reference.

BACKGROUND OF THE INVENTION

The present invention relates to a process for coating a substrate. More particularly, the invention relates to coating a substrate with a transition metal oxide-containing material, such material being an electrically conductive of ferromagnetic oxide-containing material.

An application where substrates with coatings, particularly, electrically conductive coatings, find particular usefulness is in the promotion of chemical reactions, e.g., gas/liquid phase reactions, electro catalytic reactions, photo catalytic reactions, redox reactions, etc. As an example of a type of reaction system, a catalytic, e.g., metallic, component is contacted with the material to be reacted, e.g., hydrocarbon, carbon monoxide is passed through or near to the catalytic component to enhance the chemical reaction, e.g., hydrocarbon, carbon monoxide oxidation to carbon dioxide and water and nitrogen oxide reduction to nitrogen. In addition, using a substrate for the catalytic component which is coated with an electrically conductive material is highly advantageous for electro and photo electro catalysis and/or rapid heat transfer to catalyst surfaces since a field/current can be effectively and efficiently provided to or near the catalytic component for electron transfer reactions. Many types of chemical reactions can be advantageously promoted using such coated substrates. Transition metal oxide containing coatings on substrates may promote a electron transfer whether or not the chemical reaction is conducted in the presence of a electro photo electro current or field. In addition, certain transition metal oxide coated substrates and sintered transition metal oxides are useful as gas sensors, and combustion type devices and articles. One or more other components, e.g., metal components, are often included in certain of these applications.

An application where substrates with ferromagnetic coatings, e.g., magnetic conductive coatings, find particular usefulness is memory cores, linear, power and recording head applications, magnets and heating.

In many of the above-noted applications it would be advantageous to have an electrically, electronically conductive; electro mechanical transition metal oxide which is substantially uniform, has high electronic conductivity, and has good chemical properties, e.g., morphology, stability, etc.

A number of techniques may be employed to provide conductive transition metal oxide coatings on substrates. For example, the chemical vapor deposition (CVD) process may be employed. This process comprises contacting a substrate with a vaporous composition comprising a transition metal component, for example a transition metal or zinc component and a dopant-containing material and contacting the contacted substrate with an oxygen-containing vaporous medium at conditions effective to form the doped transition metal oxide coating on the substrate. Conventionally, the CVD process occurs simultaneously at high temperatures at very short contact times so that transition metal oxide is initially deposited on the substrate. However transition metal oxide can form off the substrate resulting in a low reagent capture rate. The CVD process is well known in the art for coating a single flat surface which is maintained in a fixed position during the above-noted contacting steps. The conventional CVD process is an example of a "line-of-sight" process or a "two dimensional" process in which the transition metal oxide is formed only on that portion of the substrate directly in the path of the transition metal source as transition metal oxide is formed on the substrate. Portions of the substrate, particularly internal surfaces, which are shielded from the transition metal oxide being formed, e.g., such as pores or channels which extend inwardly from the external surface and substrate layers which are internal at least partially shielded from the depositing transition metal oxide source by one or more other layers or surfaces closer to the external substrate surface being coated, do not get uniformly coated, if at all, in a "line-of-sight" process. Such shielded substrate portions either are not being contacted by the transition metal source during line-of-sight processing or are being contacted, if at all, not uniformly by the transition metal source during line-of-sight processing. A particular problem with "line-of-sight" processes is the need to maintain a fixed distance between the source and the substrate. Otherwise, transition metal dioxide can be deposited or formed off the substrate and lost, with a corresponding loss in process and reagent efficiency.

One of the preferred substrates for use as catalysts including use as a catalyst additive in batteries, such as the positive active material of lead-acid batteries, are inorganic substrates, in particular flakes, spheres, fibers and other type particles. Although the CVD process is useful for coating a single flat surface, for the reasons noted above this process tends to produce non-uniform and/or discontinuous coatings on non-flat, non-equidistant surfaces and/or three dimensional surfaces having inner shielded surfaces and/or the processing is multi-step and/or complex and/or time consuming. Such non uniformities and/or discontinuities and/or processing deficiencies are detrimental to the electrical and chemical properties of the coated substrate. A new process, e.g., a "non-line-of-sight" or "three dimensional" process, useful for coating such substrates would be advantageous. As used herein, a "non-line-of-sight" or "three dimensional" process is a process which coats surfaces of a substrate with transition metal oxide which surfaces would not be directly exposed to transition metal oxide-forming compounds being deposited on the external surface of the substrate during the first contacting step and/or to improve the processability to conductive components and articles and/or for the type of substrate to be coated. In other words, a "three dimensional" process coats coatable substrate surfaces which are at least partially shielded by other portions of the substrate which are closer to the external surface of the substrate and/or which are further from the transition metal oxide forming source during processing, e.g., the internal and/or opposite side surfaces of a glass or ceramic particles such as fibers or spheres or flakes or other shapes or surfaces.

Although a substantial amount of work has been done, there continues to be a need for a new method for coating substrates, particularly three dimensional substrates with transition metal oxides.

The prior art processes described below follow conventional processing techniques such as by sintering of a transition metal oxide and/or the instantaneous conversion to transition metal oxide by spray pyrolysis.

For example in "Preparation of Thick Crystalline Films of Tin Oxide and Porous Glass Partially Filled with Tin Oxide," R. G. Bartholomew et al, J. Electrochem. Soc. Vol. 116, No. 9, p1205(1969), a method is described for producing films of $SnO_2$ on a 96% silica glass substrate by oxidation of stannous chloride. The plates of glass are pretreated to remove moisture, and the entire coating process appears to have been done under anhydrous conditions. Specific electrical resistivity values for $SnO_2$-porous glass were surprisingly high. In addition, doping with $SbCl_3$ was attempted, but substantially no improvement, i.e., reduction, in electrical resistivity was observed. Apparently, no effective amount of antimony was incorporated. No other dopant materials were disclosed.

In "Physical Properties of Tin Oxide Films Deposited by Oxidation of $SnCl_2$," by N. Srinivasa Murty et al, Thin Solid Films, 92(1982) 347–354, a method for depositing $SnO_2$ films was disclosed which involved contacting a substrate with a combined vapor of $SnCl_2$ and oxygen. Although no dopants were used, dopant elements such as antimony and fluorine were postulated as being useful to reduce the electrical resistivity of the $SnO_2$ films.

This last described method is somewhat similar to the conventional spray pyrolysis technique for coating substrates. In the spray pyrolysis approach transition metal chloride dissolved in water at low pH is sprayed onto a hot, i.e., on the order of about 600° C., surface in the presence of an oxidizing vapor, e.g., air. The transition metal chloride is immediately converted, e.g., by hydrolysis and/or oxidation, to $SnO_2$, which forms a film on the surface. In order to get a sufficient $SnO_2$ coating on a glass fiber substrate to allow the coated substrate to be useful as a component of a lead-acid battery, on the order of about 20 spraying passes on each side have been required. In other words, it is frequently difficult, if not impossible, with spray pyrolysis to achieve the requisite thickness and uniformity of the tin oxide coating on substrates, in particular three dimensional substrates.

Dislich, et al U.S. Pat. No. 4,229,491 discloses a process for producing cadmium stannate layers on a glass substrate. The process involved dipping the substrate into an alcoholic solution of a reaction product containing cadmium and tin metal; withdrawing the substrate from the solution in a humid atmosphere; and gradually heating the coated substrate to 650° C. whereby hydrolysis and pyrolysis remove residues from the coated substrate. Dislich, et al is not concerned with coating substrates for lead-acid batteries, let alone the stability required, and is not concerned with maintaining a suitable concentration of a volatile dopant, such as fluoride, in the coating composition during production of the coated substrate.

Pytlewski U.S. Pat. No. 4,229,491 discloses changing the surface characteristics of a substrate surface, e.g., glass pane, by coating the surface with a transition metal-containing polymer. These polymers, which may contain a second metal such as iron, cobalt, nickel, bismuth, lead, titanium, canadium, chromium, copper, molybdenum, antimony and tungsten, are prepared in the form of a colloidal dispersion of the polymer in water. Pytlewski discloses that such polymers, when coated on glass surfaces, retard soiling. Pytlewski is not concerned with the electrical properties of the polymers or of the coated substrate surfaces.

Gonzalez-Oliver, C. J. R. and Kato, I. in "Sn (Sb)-Oxide Sol-Gel Coatings of Glass," Journal of Non-Crystalline Solids 82(1986) 400–410 North Holland, Amsterdam, describe a process for applying an electrically conductive coating to glass substrates with solutions containing tin and antimony. This coating is applied by repeatedly dipping the substrate into the solution or repeatedly spraying the solution onto the substrate. After each dipping or spraying, the coated substrate is subjected to elevated temperatures on the order to 550° C.–600° C. to fully condense the most recently applied layer. Other workers, eg., R. Pryane and I. Kato, have disclosed coating glass substrates, such as electrodes, with doped tin oxide materials. The glass substrate is dipped into solution containing organo-metallic compounds of tin and antimony. Although multiple dippings are disclosed, after each dipping the coated substrate is treated at temperatures between 500° C. and 630° C. to finish off the poly-condensation reactions, particularly to remove deleterious carbon, as well as to increase the hardness and density of the coating.

In addition to the prior art tin oxide processes described above, the following conventional processing techniques illustrate sintering to zinc oxide and or the instantaneous conversion to zinc oxide by spray pyrolyis.

For example, in "Formulation of electrically conductive, thermal-control coatings" by Shai, Michal C. (Goddard Space Flight Cent., NASA, Greenbelt, Md. USA) NASA Tech Memo. 1977, NASA TM-X-73537, three materials for electrical conductor thermal coatings of the International Sun Earth Explorer satellite were studied. Combinations of ZnO, $Al_2O_3$, $Co_3O_4$, and Na or K silicate were used. The coatings were fabricated by stirring oxide aqueous slurries for 5 hours, heating 48 hours at 90° C., 72 hours at 110° C., and firing at 1175° C. for 15 minutes. Coatings were satisfactory for these conventionally prepared ZnO materials.

In "Manufacture of electrically conducting fine zinc oxide," Nihon Kagaku Sangyo Co., Ltd., Japan Kokai Tokyo Kobe 81 69.266 (CL C04B35/00), 10 Jun. 1981, Application 79/141,989, 06 Nov. 1979; an electrically conducting fine powder ZnO useful for electrostatic recording paper is prepared from an aqueous solution containing a Zn salt and a compound selected from $Al_2O_3$, Sn oxide, Co oxide, Cr oxide, Ti oxide, Ge oxide, Ga oxide, and In oxide by neutralizing the materials, presintering, and sintering in gas at 600–1000° C. Thus, $ZnCl_2$ 170 and $AlCl_3$ 13.5 g were dissolved in 1 liter of $H_2O$ and 14% $NH_4OH$ was slowly added to adjust the pH to. 8.12. The material was filtered, dried, heated, at 450° C. for 1 hour and sintered in a nitrogen gas at 800° C. for 60 minutes to obtain 94 g of an electrically conductive ZnO having an intrinsic resistivity of 6.7×10.

In "Preparation of zinc oxide conductors," Shiromizu Kagaku Kogyo K. K. Japan Kokaj Tokyo Kobe JP 83,161,923 [83,161,923] (CL C01G9/00), 26 Sep. 1983. Application 82/41,947, 17 Mar. 1982; ZnO (100 parts) and a compound (0.5–20 parts) selected from $Al_2O_3$, Ti oxide, and Sn oxide (or their compounds which give oxides upon thermal decomposition) are treated in an aqueous medium in the presence of compound (5–100 parts) selected from $(NH_4)_2CO_2$, $NH_4HCO_3$, $NH_4Cl$, $NH_4NO_2$ $(NH_4)_2SO_4$, and urea. The treated mixture is fired in a reducing atmosphere to give conductive ZnO. ZnO (100 g) was dispersed in $H_2O$, then a mixture of $(NH_4)_2CO_2$ (130 g) and $Al_2(SO_4)_2$ (5 g as octahydrate) solution was added and the dispersion heated to 60° C. The mixture was then filtered and the filter cake fired at 800° to give an Al-doped ZnO having good conductivity. The conductor was useful in preparing electrostatic imaging sheets.

In "Thin-film surface-acoustic-wave devices," Mitsuyu, Tsuneo; Ohji, Kenzo; Ono, Shusuke; Yamazaki, Osamu; Wasa, Kiyotaka (Mater. Res. Lab., Matsushita Electr. Ind. Co., Osaka, Japan), Natl. Tech. Rep. ((Matsushita Electr. Ind. Co., Osaka) 1976, 22(6), 905-23 (Japan), highly oriented radio-frequency sputtered films of ZnO and $Bi_{12}PbO_{19}$ were prepared. A hemispherical electrode configuration was very effective in orienting ZnO in the c axis on a glass plate. The obtained electromechanical coupling factor was up to 88% of the bulk single-crystal value.

In "Optical and electronic properties of zinc oxide films prepared by spray pyrolysis," Major S.; Banerjee, A; Chopra, K. L (Cent. Energy Stud., Indian Inst. Technol., New Delhi, 110016 India.) Thin Solid Films 1985, 125(0 2), 179–85 the optical properties of transparent conducting ZnO films prepared by spray pyrolysis were studied in the UV visible and IR regions. The specular reflectance and transmittance data were used to determine the optical constants which correlate well with the data on single-crystal ZnO in the visible region. The films doped with 3 weight % indium exhibit thermal stability up to 650 K in vacuum and up to 450 K in O ambients. The changes in the electronic properties of pure ZnO films on annealing in O and vacuum were attributed to chemisorption and desorption of O at grain boundaries.

A number of techniques have also be employed to provide conductive copper oxide coatings on inorganic substrates. For example, a high temperature sintering process may be employed. This process comprises contacting a substrate with an oxide source comprising for example a copper-oxide component, a yttrium oxide and barium oxide source material and contacting the components with an oxygen-containing vaporous medium at sintering temperature conditions effective to form the conductive copper oxide coating on the substrate.

However, superconductor materials are very difficult to work with, especially because of their brittleness. Once the material has undergone the sintering process, it is very difficult to form the material, particularly since the material is usually a ceramic typical of most superconductors.

Such superconducting materials in their finished states are extremely brittle, unmachineable and unbendable. Whatever form they are in after sintering is the form they stay in and little or no alterations have been developed.

Conventional superconducting materials, such as niobium-titanium and niobium-tin operate at liquid-helium temperatures (4.5 Kelvin) for cooling. New superconductors, currently under development, operate in liquid nitrogen, i.e. an expensive cryogenic fluid, at temperatures of 77 Kelvin or higher.

Conventional processing of copper oxide conductors, particularly for superconductors include:

(1) Substrate depositions, where ion beams are used on zirconium and sapphire substrates in various types of atmospheres. This method is presently being developed for microprocessor applicable films. A film is placed on to the flat surface, (not on a three dimensional surface) of a microprocessor ship; (2) Fiber (whisker) growth methods, which produce pure superconductor fibers using a laser heated growth method; and (3) extrusion.

A limitation of substrate deposition is the high cost of processing and expensive equipment required, i.e., sapphire substrates, ion beam deposition furnaces, lasers. However, the prior superconductor processes are still in an early stage of development due to the recent discoveries in copper oxide based superconductor.

One process undergoing development for applying a superconductor layer or material onto a copper wire, includes surrounding a copper wire with a yttrium-oxide and barium-carbonate powder pack. The powder is fired similar to other conventional methods of processing of bulk superconducting material.

During the process, the outer layer of the copper wire is oxidized producing a copper oxide layer around the wire. The yttrium and barium components react with this copper oxide by diffusion to produce a superconducting compound, a layer or an outer coating.

The results published to date showed a 5- to 10-micron layer (depending on firing time) of material in which all three of the constituent elements were present, as observed on the copper wire by a scanning electron microscope. Whether or not they were present consistently and continuously in the appropriate crystal from was not determined, but the Energy Dispersive Analysis indicated a correct element ratios.

It was also observed that the material could possibly be in patches or the crystals slightly removed from each other, thus disabling a continuous circuit. SEM analysis revealed the porous nature of the ceramic material and the agglomerated, grainy mix of the various phases within the material.

The conventional ceramic processing techniques have been adopted to prepare kilogram size powder batches and to fabricate bulk superconductors. In most cases, yttrium oxide, the oxide, peroxide, hydroxide or carbonate of barium and the oxide or carbonate of copper are used as precursors for the $YBa_2Cu_3O_x$ compound. Appropriate quantities of these precursor powders are mixed effectively by ball milling. Carbonates and oxides of yttrium, barium and copper have little solubility in water and are readily mixed in an aqueous vehicle.

Calcined powders can be formed into different shapes and configurations by various forming techniques including dry pressing, tape casting, screen printing and extrusion. The dry pressing method has been used to fabricate bulk superconducting parts with dimensions ranging from 90.1 to 20 cm. Superconducting wires have been prepared by extrusion. Superconducting ceramic tapes (20 to 100 μm thick) have been prepared by a tape casting technology similar to that used in fabrication of multilayer ceramic capacitors and ceramic packages for integrated circuits. Layers of superconducting and insulating tapes can be laminated to form multilayer device structure. Superconducting lines and pads have been prepared by the screen printing process. A viscous paste is first formed by mixing a superconducting powder with organic binders. The paste is then printed through a patterned fine-meshed screen onto a substrate to form thick film superconducting patters having −5 to 20 um thickness.

The formed superconductor parts and circuit patterns are then fired at 900°–1000° C. to densify the ceramic. Later, proper oxidation anneal is usually necessary to provide a sufficient oxygen content for the required superconducting device properties.

Some factors are known to contribute to a better superconducting material and these factors include a higher density resulting in improved mechanical properties and a highly oriented texture in this films exhibiting a high critical current density.

Wires and cables of the ceramic materials are usually made from molded, extruded, or compressed polycrystalline powders. The flow of current between the polycrystalline grains is limited by boundaries between grains that act as "weak links" and the grains' directional anisotropy, or nonuniformity, with respect to current flow in the crystal. Current flow is impeded when it must follow a wandering path through randomly oriented grains. Aligning the grains can help to increase the current-carrying capacity of the ceramic material.

A significant problem with currently available thick oxide materials is their behavior in applied magnetic fields. Superconductors are either Type I or Type II materials. Both types exclude magnetic fields and are superconducting until a critical field level is reached. Above this level, Type I materials become nonsuperconducting. Type II materials, however, continue to superconduct, but allow magnetic flux to penetrate portions of the crystal lattice only when an upper critical field is reached do the Type II materials become nonsuperconducting. Most high-temperature superconductors are Type II materials.

Although the new superconductors have extremely high upper critical field limits, the "flux lattice," which is how the magnetic fields penetrate the superconductor, is unstable. Unless the flux lattice is "pinned," magnetic forces from circulating currents act on the magnetic field lines and cause the flux lattice to move. This movement, or flux creep, creates resistance to current flow.

It is generally believed that, because thin films of the materials can carry large currents, flux creep is not an intrinsic property of oxide superconductors material. There is a need to be able to manufacture film, particularly thin films and to be able to control boundaries between grains. There is a need to be able to manufacture film, particularly thin films and to be able to control boundaries between grains.

The above conventional sintering processes are examples of processes in which the oxides are generally formed first, particularly as powders, followed by sintering on flat and or smooth powder accessible surfaces.

A number of techniques have employed to provide conductive iron oxide coatings on substrates. Most ferrites are prepared as ceramic materials by standard ceramic processing. In this process the constituent raw materials, oxides, hydroxides, or carbonates, are weighed and first milled in a steel mill using steel balls as the milling media and water as the carrier. During milling, the raw materials are mixed to yield a homogeneous mixture. Other mixing methods may also be employed such as dry mixing of raw materials. The milling gives uniform mixing and results in some size reduction leading to better reactivity in the calcining step. In the calcining (sometimes called presintering) reaction, the raw materials are heated to 800° to 1300° C. and form the ferrite compound. The carbonates decompose and react by solid-state diffusion to form the final compound.

In the case of the nickel-zinc-spinel ferrites, the powder is calcined at a temperature of ca 1027° C. to yield an agglomerated, friable powder that is essentially 100% converted to the spinel phase. However, in the case of the manganese-zinc-ferrites, the calcining conditions are such that the material is 50–85% converted to spinel. Time and temperature are the most important control parameters in the calcining step.

The purpose of this millings is to further homogenize the material and to reduce the particle size to permit subsequent pressing and sintering. The milling itself can be carried out in a variety of ways, for example, wet-ball mill with steel balls in a manner analogous to the first milling. The main objective is to get a finely divided powder that can be slurried and spray dried.

Following the second milling, the material must be granulated so that it will be free flowing and can be dry pressed into the desired shape. A method for producing ferrite powder is to add a binder such as poly (ethylene glycol) or poly (vinyl alcohol) at 1–4 wt % and sufficient water for form a slurry that is about 65–70 wt % ferrite. The slurry is spray dried to yield a dry powder consisting of small spherical particles having a narrow size distribution.

Very thin parts, such as used in memory cores, amy be formed by tape casting followed by punching the desired shape. Parts that have a high length-to-diameter ratio may be formed by either extrusion or by isostatic pressing.

In the sintering process, the ceramic material is densified and the final magnetic properties are developed. Some materials such as the iron-deficient nickel-zinc ferrites and the M-type hexagonal ferrites may be fired in air because all the cations exist at their highest valence state. However, with the manganese-zinc ferrites the amount of ferrous iron ($Fe^{2+}$) in the crystal lattice is controlled. Typical temperatures for the sintering zone are in the range of 1275°–1450° C.; sintering time may range from 20 minutes to 12 hours.

The next zone in the kiln is called the anneal or equilibration zone, where the temperature is dropped to 100°–1300° C. and the oxygen content of the atmosphere is lowered by the introduction of nitrogen gas. At this elevated temperature the ferrite equilibrates quickly with the atmosphere, and the desired ferrous iron level is established. Following the annealing step, the parts are cooled as rapidly as possible and the oxygen content of the atmosphere is reduced still further.

In an attempt to improve chemical homogeneity, a wet-chemical process was designed in which an aqueous solution was prepared containing the metal cations. Addition of a strong base (eg, NaOH) precipitated an intermediate hydroxide which was subsequently oxidized by bubbling air through the suspension. The results was a homogeneous fine-particle ferrite. A similar type of process used an ammonium bicarbonate-ammonium hydroxide mixture as the precipitating agent followed by conventional calcining.

The preparation of ferrite compounds by the cryochemical method has also been investigated. In this technique, an aqueous solutio is sprayed into a chilled liquid (eg, hexane) where the droplets freeze into beads ca) 0.4 mm diameter. These pellets are removed from the liquid and placed in a freeze dryer where the moisture is removed by sublimation. The resultant pellets are converted to the spinel by calcining.

The preparation of the hexagonal ferrites by wet-chemical precipitation, topotactic reaction, and fluidized-bed reaction has been investigated. However, the most common method is standard ceramic processing.

Critical areas of process control in the conventional type processing are the composition and the presintering conditions. The calcining step is especially critical because it determines to a large extent the properties of the magnet after sintering. At a typical calcining temperature of 1300° C. the material reacts completely to form the hexagonal phase. If calcining takes place at a lower temperature, the magnetic properties are not affected adversely but the calcined material is too soft and the subsequent milling step which gives a very fine particle size. This leads to difficulty in pressing and a very high shrinkage during sintering. If, on the other hand, the sintering temperature is too high, the particles are too hard and the particle size after milling is rather coarse. Although this does not cause a pressing problem, after sintering the particles are too large and the shrinkage and coercive force are both too low.

After calcining the material must be milled to reduce the particle size to the range of 1 um in order to obtain single-domain properties.

Fabrication of the milled powder into parts can take place by a number of methods depending on the degree of magnetic alignment desired. For the lowest-grade material, the milled powder is pray dried and then dry pressed into the required shape. In these materials, the individual particles are randomly aligned with respect to each other, resulting in a isotropic magnet in which the magnetic properties are the same in all directions.

Anisotropic magnets are prepared by dry or wet pressing the material in the presence of an external magnetic field which causes the individual magnetic particles to align themselves with that field. The dry-pressing technique is quite similar to that used for preparing isotropic magnets, except that pressing takes place in the presence of a magnetic field.

Wet pressing, gives the highest degree of alignment with the field because the individual particles are much freer to rotate under its influence. When alignment is essentially complete, the water is removed by applying a vacuum to the die cavity, and a very fine filter paper prevents the powder from being pulled out with the water.

Sintering of dry-pressed parts can take place immediately after forming. However, wet-pressed parts must be carefully dried to remove most of the residual moisture before being placed in the kiln. Drying under controlled conditions may take from 10 to 200 hours, depending on size and shape.

The pressed parts are sintered in the air at 1125°–1375° C. to yield a dense ceramic material. In order to minimize the grain growth that occurs during sintering, the firing temperature is kept as low as possible.

Conventional processing has been used for the preparation of powder for follow on consolidation into final shapes. Such processing has not been directed at or concerned with thin and/or thick films and a wide variety of inorganic substrates, the novel components and articles produced or the unique properties of such coated components in a wide variety of applications.

SUMMARY OF THE INVENTION

A new process for at least partially coating a substrate with a transition metal electrically conducting or ferromagnetic oxide-forming material has been discovered. In brief, the process comprises contacting the substrate with a transition metal oxide precursor, for example, stannous chloride, zinc chloride, cuprous chloride, ferric chloride in a vaporous form and/or in a liquid form and/or in a solid (e.g., powder) form, to form a transition metal oxide precursor-containing coating, for example, a transition metal chloride-containing coating, on the substrate; preferably contacting the substrate with at least one interacting component, i.e., a conductivity interactive or a ferromagnetic interacting component and contacting the coated substrate with an oxidizing agent to form a transition metal oxide-containing coating and recovering a coated substrate, preferably an semi conductor ferromagnetic oxide-containing coated substrate, more preferably an n type oxide semi conductor, more particularly a doped semi-conductor and/or semi conductors having a defect and/or non-stoichiometric structure which enhances conductivity. The contacting of the substrate with the transition metal oxide precursor and with the interacting component can occur together, i.e., simultaneously, or in separate steps. The electrically conductive or ferromagnetic coated substrate is then recovered.

The process can provide coated substrates including single and mixed oxides which have substantial electrical conductivity or ferromagnetic properties so as to be suitable for use as components in a wide variety of applications. Substantial coating uniformity, e.g., in the thickness of the transition metal oxide-containing coating and in the distribution of interacting component in the coating, is obtained. Further, the present transition metal oxide coated substrates in general have outstanding stability, e.g., in terms of electrical or magnetic properties and morphology and are thus useful in various applications. In addition, the process is efficient in utilizing the materials which are employed to form the coated substrate.

DETAILED DESCRIPTION OF THE INVENTION

In one broad aspect, the present coating process comprises contacting a substrate with a composition comprising a transition metal oxide precursor, such as transition metal chloride forming components, transition metal complexes and mixtures thereof, at conditions, preferably substantially non-deleterious oxidizing and/or hydrolyzing conditions, more preferably in a substantially inert environment or atmosphere, effective to form a transition metal oxide precursor-containing coating, such as a stannous chloride, zinc chloride, cuprous chloride or ferric chloride containing coating, on at least a portion of the substrate. The substrate is preferably also contacted with at least one conductivity or ferromagnetic interacting component, hereinafter referred to as interacting component, such as at least one dopant compound, at conditions, preferably and/or hydrolyzing substantially non-deleterious oxidizing and/or hydrolyzing conditions, more preferably in a substantially inert atmosphere, effective to form an interacting component-containing coating, such as a dopant component-containing coating, on at least a portion of the substrate. The substrate, including one or more coatings containing transition metal oxide precursor, and preferably an interacting component, for example a dopant component, is contacted with at least one oxidizing agent at conditions effective to convert the transition metal oxide precursor to transition metal oxide and form a transition metal oxide-containing, preferably a binary or ternary transition metal oxide-containing, coating, preferably a semi conductor, super conductor or ferromagnetic transition metal oxide-containing coating, on at least a portion of the substrate. By "non-deleterious oxidation" is meant that the majority of the oxidation of transition metal oxide precursor, for example stannous chloride, zinc chloride, cuprous chloride and ferric chloride coated onto the substrate, takes place in the oxidizing agent contacting step of the process after distribution and/or equilibration of the precursor, rather than in process step or steps conducted at non-deleterious oxidizing hydrolyzed conditions. The process as set forth below will be described in many instances with reference to stannous chloride, zinc chloride, cuprous chloride and ferric chloride which have been found to provide particularly outstanding process and product properties. However, it is to be understood that other suitable transition oxide precursors are included within the scope of the present invention.

The interacting component-containing coating may be applied to the substrate before and/or after and/or during the time the substrate is coated with transition metal chloride and/or after contacting with the oxidized agent. In a particularly useful embodiment, the transition metal chloride and the interacting component are both present in the same composition used to contact the substrate so that the transition metal containing coating further contains the interacting component. This embodiment provides processing efficiencies since the number of process steps is reduced (relative to separately coating the substrate with transition metal precursor and interacting forming component). In addition, the relative amount of transition metal precursor and interacting component used to coat the substrate can be effectively controlled in this "single coating composition" embodiment of the present invention.

In another useful embodiment, the substrate with the transition metal chloride-containing coating and optimally the interacting component-containing coating is maintained at conditions preferably at substantially non-deleterious oxidizing and/or hydrolyzing conditions for example, conditions which reduce and/or minimize the formation of transition metal oxide on a relatively small portion of the substrate or off the substrate, for a period of time effective to do at least one of the following: (1) coat a larger portion of the substrate with transition metal chloride containing coating; (2) distribute the transition metal chloride coating over the substrate; (3) make the transition metal chloride-containing coating more uniform in thickness; and (4) distribute the interacting component more uniformly in the transition metal chloride-containing coating. Such maintaining preferably occurs for a period of time in the range of about 0.05 or 0.1 minute to about 20 minutes in the presence of an inert gas an/or oxygen i.e. air, under non-deleterious oxidizing conditions. Such maintaining is preferably conducted at the same or a higher temperature relative to the temperature at which the substrate/transition metal chloride-containing composition contacting occurs. Such maintaining, in general, acts to make the coating more uniform and, thereby, for example, provides for beneficial electrical conductivity of ferromagnetic properties. The thickness of the transition metal oxide-containing coating can vary over a wide range and optimized for a given application and is generally in the range of from about 0.1 to about 100 microns or even from about 0.1 to about 50 microns, more preferably from about 0.1 micron to about 10 microns, still more preferably from about 0.25 micron to about 1.25 microns or from even about 0.2 to about 1 micron.

The transition metal which is contacted with the substrate is in a vaporous phase or state, or in a liquid phase or state, or in a solid state or phase (powder) at the time of the contacting. The composition which includes the transition metal chloride preferably also includes the interacting component or components. This composition may also include one or more other materials, e.g., dopants, catalysts, grain growth inhibitors, solvents, etc., which do not substantially adversely promote the premature hydrolysis and/or oxidation of the transition metal chloride and/or the interacting component, and do not substantially adversely affect the properties of the final product, such as by leaving a detrimental residue in the final product prior to the formation of the transition metal oxide-containing coating. Thus, it has been found to be important, e.g., to obtaining a transition metal oxide coating with good structural, mechanical and/or electronic and/or magnetic properties, that undue hydrolysis of the transition metal chloride and interacting component be avoided. This is contrary to certain of the prior art which actively utilized the simultaneous hydrolysis reaction as an approach to form the final coating. Examples of useful other materials include organic components such as acetonitrile, ethyl acetate, dimethyl sulfoxide, propylene carbonate and mixtures thereof; certain inorganic salts and mixtures thereof. These other materials, which are preferably substantially anhydrous, may often be considered as a carrier, e.g., solvent, for the transition metal chloride and/or interacting component to be contacted with the substrate.

The transition metal oxide coatings are derived from transition metal precursors as set forth above which transition metal precursors contain transition elements of atomic numbers 21–31, 39–49 and 71–81, inclusive. Examples of transition metals are tin, copper, zinc, iron, chromium, tungsten, titanium, molybdenum and indium. The preferred transition elements are copper, zinc, iron, chromium, tungsten, titanium, molybdenum, indium and mixtures. The particularly preferred transition metal elements are zinc, iron, chromium, titanium and mixtures thereof.

As set forth above the transition metal oxide precursor is preferably selected from the group consisting of one or more transition metal chlorides, organic complexes, organic salts, particularly organic complexes and salts which do not adversely oxidize and/or hydrolyze under the conditions of coating the substrate with the transition metal oxide precursor and mixtures thereof. Particularly preferred precursors are transition metal chlorides and organic complexes, particularly di-ketone type complexes, i.e., acetylacetonate complexes. It is preferred that the precursors have a temperature range between its melting point and boiling point, which allows for effective maintaining and equilibrium of the precursor coating as more specifically set forth above. For example, stannous chloride is preferred over stannic chloride due to the wide temperature range from melting point to boiling point of stannous chloride. As set forth above, the preferred complexes are polyfunctional complexes, i.e., di-ketone complexes, preferred organic complexes and salts are precursors which do not under go adverse rapid hydrolysis and/or oxidation and/or require undue pyrolyses of the organic carbon portion of the complex or salt and prior to and/or during the maintaining equilibrium step of the process of this invention and/or prior to the oxidation step for conversion to the transition metal oxide. In addition, such polyfunctional complexes, i.e., ketone complexes are preferred over organic acid and/or alcoholate transition metal salts.

Typical examples of transition metal chloride precursors are stannous chloride, cuprous chloride, zinc chloride, ferric chloride, tungsten penta chloride, tungsten hexa chloride, molybdenum penta chloride, indium dichloride, indium monochloride, chromium$^2$ chloride and titanium tetrachloride. Preferred transition metal complexes are polyfunctional ketone complexes wherein such poly ketone functionality is capable of complexing with the transition metal. For example, acetylacetonate complexes, i.e., complexes of zinc, chromium and the like.

It has also been found that the substrate can first be contacted with a transition metal oxide precursor powder, particularly transition metal chloride powder, preferably with a film forming amount of such powder, followed by increasing the temperature of the powder to the liquidous point of the powder on the substrate and maintaining the coated substrate for a period of time at conditions including the increased temperature effective to do at least one of the following: (1) coat a larger portion of the substrate with the transition metal oxide precursor-containing coating; (2) distribute the coating over the substrate; and (3) make the coating more uniform in thickness. Preferably, this step provides for the equilibration of the coating on the substrate. The size distribution of the powder, for example, transition metal chloride powder, and the amount of such powder applied to the substrate are preferably chosen so as to distribute the coating over substantially the entire substrate.

The transition metal oxide precursor powder can be applied to the substrate as a powder, particularly in the range of about 5 or about 10 to about 125 microns in average particle size the size in part being a function of the particle size, i.e. smaller particles generally require smaller size powders. The powder is preferably applied as a charged fluidized powder, in particular having a charge opposite that of the substrate or at a temperature where the powder contacts and adheres to the substrate. In carrying out the powder coating, the coating system can be, for example, one or more electrostatic fluidized beds, spray systems having a fluidized chamber, and other means for applying powder, preferably in a film forming amount. The amount of powder used is generally based on the thickness of the desired coating and incidental losses that may occur during processing. The powder process together with conversion to a transition metal oxide-containing coating can be repeated to achieve desired coating properties, such as desired gradient conductivities.

Typically, the fluidizing gaseous medium is selected to be compatible with the transition metal oxide precursor powder, i.e., to not substantially adversely affect the formation of a coating on the substrate during melting and ultimate conversion to a transition metal oxide-containing film.

Generally, gases such as air, nitrogen, argon, helium and the like, can be used, with air being a gas of choice, where no substantial adverse prehydrolysis or oxidation reaction of the powder precursor takes place prior to the oxidation-reaction to the transition metal oxide coating as previously discussed under equilibration and maintaining. The gas flow rate is typically selected to obtain fluidization and charge transfer to the powder. Fine powders require less gas flow for equivalent deposition. It has been found that small amounts of water vapor enhance charge transfer. The temperature for contacting the substrate with a powder precursor is generally in the range of about 0° C. to about 100° C. or higher, more preferably about 20° C. to about 40° C., and still more preferably about ambient temperature. The substrate however, can be at a temperatures the same as, higher or substantially higher than the powder.

The time for contacting the substrate with precursor powder is generally a function of the substrate bulk density, thickness, powder size and gas flow rate. The particular coating means is selected in part according to the above criteria, particularly the geometry of the substrate. For example, particles, spheres, flakes, short fibers and other similar substrate, can be coated directly in a fluidized bed themselves with such substrates being in a fluidized motion or state. For fabrics, single fibers, rovings and tows a preferred method is to transport the fabric and/or roving directly through a fluidized bed for powder contacting. In the case of rovings and tows, a fiber spreader can be used which exposes the filaments within the fiber bundle to the powder. The powder coating can be adjusted such that all sides of the substrate fabric, roving and the like are contacted with powder. Typical contacting time can vary from seconds to minutes, preferably in the range of about 1 second to about 120 seconds, more preferably about 2 seconds to about 30 seconds.

Typical transition metal oxide precursor powders are those that are powders at powder/substrate contacting conditions and which are liquidous at the maintaining conditions, preferably equilibration conditions, of the present process. It is preferred that the powder on melting substantially wets the surface of the substrate, preferably having a low contact angle formed by the liquid precursor in contact with the substrate and has a relatively low viscosity and low vapor pressure at the temperature conditions of melting and maintaining, preferably melting within the range of about 100° C. to about 650° C. or higher. For tin oxide precursor powder it is preferred that melting is within the range of from about 100° to about 450°, more preferably about 250° C. to about 400° C. Typical powder transition metal oxide precursors are stannous chloride, low molecular weight organic salts or complexes of tin, particularly low molecular weight organic salts and complexes such as stannous acetate and acetylacetonate complexes of tin.

An additional component powder, such as a dopant-forming powder, can be combined with the transition metal oxide precursor powder. A particularly preferred dopant-forming powder for tin oxide is stannous fluoride. Further, an additional component, such as a dopant, for example a fluorine or fluoride component, indium, or antimony for tin oxide coatings can be incorporated into the coating during the maintaining step, for example hydrogen fluoride gas as a source of fluoride. A combination of the two methods can also be used for additional component incorporation.

Typical zinc oxide precursor powders are those that are powders at powder/substrate contacting conditions and which are liquidous at the maintaining conditions, preferably equilibration conditions, of the present process, preferably melting within the range of about 100° C. to about 450° C., or higher, more preferably about 250° C. to about 400° C. Typical powder zinc oxide precursors are zinc chloride, low molecular weight organic salts or complexes of zinc, particularly low molecular weight organic salts and complexes such as zinc acetate and acetylacetonate complexes of zinc.

An additional component powder, such as a dopant-forming powder, can be combined with the zinc oxide precursor powder. Particularly preferred dopant-forming powders are aluminum and chromium acetylacetonate, benzylate and methyl substituted benzylate, cobalt II chloride, gallium dichloride, indium mono and dichloride, stannous chloride and germanium monoxide. Further, an additional component, such as a dopant, for example a chloride component, aluminum or titanium, can be incorporated into the coating during the maintaining step, for example aluminum chloride, titanium tetrachloride gas as a source of the metal dopant, preferably in a hydrogen chloride atmosphere. A combination of the two methods can also be used for additional component incorporation.

Typical copper oxide precursor powders are those that are powders at powder/substrate contacting conditions and which are liquidous at the maintaining conditions, preferably melting within the range of about 100° C. to about 650° C., more preferably about 435° C. to about 630° C. Typical powder copper oxide precursors are cuprous chloride, cuprous oxide low molecular weight organic salts or complexes of copper, particularly low molecular weight organic salts and complexes including poly functional/carboxyl, hydroxyl and ketone such as cuprous acetate and acetylacetonate complexes of copper.

An additional component powder, such as the conductivity forming additional powders, can be combined with the copper oxide precursor powder. The particularly preferred additional powders are yttrium chloride and/or oxide, barium carbonate and/or oxide or peroxide. Further, additional components can be incorporated into the coating during the maintaining step, for example a gas as a source of such additional component. A combination of the two methods can also be used for additional component incorporation.

As set forth above, the copper oxide precursor powders and additional component conductivity interacting component can produce a film forming amount precursor component on the substrate, particularly distribution of the film over a substantial part of said substrate, followed by oxidation. In addition to the precursor components set forth above, nitrates, sulfates and their hydrates, as well as the hydrates of for example chloride, can be selected and used within the processing requirements for producing such conductive films.

Typical iron oxide precursor powders are those that are powders at powder/substrate contacting conditions and which are liquidous at the maintaining conditions of the present process, preferably melting within the range of about 300° C. to about 450° C., or higher, more preferably about 350° C. to about 300° C. Typical powder iron oxide precursors are ferric chloride, low molecular weight complexes of iron, such as poly functionality and complexes with carboxylic, ketone and hydroxyl functionality, such as acetylacetonate complexes of iron.

An additional component powder, such as a dopant-forming powder, can be combined with the iron oxide precursor powder. Particularly preferred interacting-forming powders are compounds of nickel, zinc, manganese, yttrium, the rare earths, barium, calcium and silica. Further, an additional component, such as an interacting component, for example a chloride hydrate and/or nitrate hydrate and/or a di-ketone complex can be incorporated into the coating during the maintaining step, for example, zinc acetylacetonate as a source of the metal interacting compound, preferably in a hydrogen chloride atmosphere. A combination of the two methods can also be used for additional component incorporation.

The powder transition metal oxide precursor on melting is maintained and/or equilibrated as set forth above. In addition, temperatures can be adjusted and/or a component introduced into the melting/maintaining step which can aid in altering the precursor for enhanced conversion to transition metal oxide. For example, gaseous hydrogen chloride can be introduced to form partial or total halide salts and/or the temperature can be adjusted to enhance decomposition of, for example, transition metal organic salts and/or complexes to more readily oxidizable transition metal compounds. The interacting component can also be present in an oxide or precursor form in the melt as a dispersed preferably as a finely dispersed solid. The oxide can be incorporated advantageously as part of the powder coating of the substrate material.

A fluidizable coated substrate, such as substrates coated directly in a fluid bed of powder, can be subjected to conditions which allow liquidous formation by the transition metal oxide precursor and coating of the substrate. A particularly preferred process uses a film forming amount of the transition metal oxide precursor which allows for coating during the liquidous step of the process, and which substantially reduces detrimental substrate agglomeration. The conditions are adjusted or controlled to allow substantially free substrate fluidization and transport under the conditions of temperature and bed density, such as dense bed density to lean bed density. The coated substrate can be further transported to the oxidation step for conversion to transition metal oxide or converted directly to transition metal oxide in the same reactor/processing system or such conversion can take place in the same reactor under substrate fluidizing conditions. In the former, liquidous coated substrate is transported as a dense bed to a fluidized oxidation zone, such zone being a fluidized zone preferably producing a conversion to transition metal oxide on the substrate of at least about 80% by weight.

The transition metal chloride and/or interacting component to be contacted with the substrate may be present in a molten state. For example, a melt containing molten transition metal chloride and/or interacting component, i.e. chloride or fluoride salt, may be used. The molten composition may include one or more other materials, having properties as noted above, to produce a mixture, e.g., a eutectic mixture, having a reduced melting point and/or boiling point. The use of molten transition metal chloride and/or interacting component provides advantageous substrate coating while reducing the handling and disposal problems caused by a solvent. In addition, the substrate is very effectively and efficiently coated so that coating material losses are reduced.

The transition metal chloride and/or interacting component to be contacted with the substrate may be present in a vaporous and/or atomized state. As used in this context, the term "vaporous state" refers to both a substantially gaseous state and a state in which the transition metal chloride and/or interacting component are present as drops or droplets and/or solid dispersion such as colloidal dispersion in a carrier gas, i.e., an atomized state. Liquid state transition metal chloride and/or interacting component may be utilized to generate such vaporous state compositions.

In addition to the other materials, as noted above, the composition containing transition metal chloride and/or the dopant-forming component may also include one or more grain growth inhibitor components. Such inhibitor component or components are present in an amount effective to inhibit grain growth in the transition metal oxide-containing coating. Reducing grain growth leads to beneficial coating properties, e.g., higher electrical conductivity, more uniform morphology, and/or greater overall stability. Among useful grain growth inhibitor components are components which include at least one metal, in particular potassium, calcium, magnesium, silicon and mixtures thereof. Of course, such grain growth inhibitor components should have no substantial detrimental effect on the final product.

The interacting component may be deposited on the substrate separately from the transition metal chloride, e.g., before and/or during and/or after the transition metal chloride/substrate contacting and after contacting with the oxidizing agent, such as by dopant implantation. If the interacting component is deposited on the substrate separately from the transition metal chloride, it is generally preferred that the interacting component, be deposited after the transition metal chloride, such as to form soluble and/or eutectic mixtures and/or dispersions.

Any suitable interacting component may be employed in the present process. Such interacting component should provide sufficient interacting component so that the final transition metal oxide coating has the desired properties, e.g., electronic conductivity, stability, magnetic properties, etc. Care should be exercised in choosing the interacting component or components for use. For example, the interacting component should be sufficiently compatible with, for example, the transition metal chloride so that the desired transition metal oxide coating can be formed. Interacting components which have excessively high boiling points and/or are excessively volatile (relative to transition metal chloride), at the conditions employed in the present process, are not preferred since, for example, the final coating may not be sufficiently developed with the desired properties and/or a relatively large amount of the interacting component or components may be lost during processing. It may be useful to include one or more property altering components, e.g., boiling point depressants, in the composition containing the dopant-forming component to be contacted with the substrate. Such property altering component or components are included in an amount effective to alter one or more properties, e.g., boiling point, of the interacting component, e.g., to improve the compatibility or reduce the incompatibility between the interacting component and transition metal chloride.

Particularly useful dopants for use in the tin oxide products and process of this invention are anion dopants, particularly fluorine components selected from stannous fluoride, stannic fluoride, hydrogen fluoride, ammonium fluoride, ammonium bi-fluoride and mixtures thereof. When stannous fluoride is used as a fluorine component, it is preferred to use one or more boiling point depressants to reduce the apparent boiling point of the stannous fluoride, in particular to at least about 850° C. or less. The preferred dopants are those that provide for optimum dopant incorporation while minimizing dopant precursor losses, particularly under the preferred process conditions as set forth therein. In addition oxides or sub-oxides can also be used, including where dopant incorporation is accomplished during the oxidation sintering contacting step.

The use of a fluorine or fluoride dopant is an important feature of certain aspects of the present invention. First, it has been found that fluorine dopants can be effectively and efficiently incorporated into the tin oxide-containing coating. In addition, such fluorine dopants act to provide tin oxide containing coatings with good electronic properties referred to above, morphology and stability. This is in contrast to certain of the prior art which found antimony dopants to be ineffective to improve the electronic properties of tin oxide coatings in specific applications.

Particularly useful dopant components for use in the zinc oxide products and process of the present invention are selected from aluminum, cobalt, gallium, titanium, indium, tin and germanium, particularly oxide forming dopant components, as well as zinc metal forming compounds and/or the use of such process condition which form dopant concentrations of zinc metal. Preferred dopant oxide precursors are set for above and include the halide, preferably the chlorides, organic complexes, such as low molecular weight organic acid salts, complexes, such as low molecular weight, ketone components, preferably 2, 4, dienes, benzylates and the like. The preferred dopants are those that provide for optimum dopant oxide incorporation while minimizing dopant precursor losses, particularly under the preferred process condition as set forth herein. Oxides or suboxides can also be used where dopant incorporation is accomplished during the oxidation sintering contacting step.

The use of a dopant is an important feature of certain aspects of the present invention. First, it has been found that such dopants, particularly alumina can be effectively and efficiently incorporated into the zinc oxide-containing coating. In addition, such dopants act to provide zinc oxide-containing coatings with good electronic properties referred to above, morphology and stability.

Any suitable conductivity compatible and/or enhancing component may be employed in the copper oxide product and processes of this invention. Such conductivity interacting component should provide sufficient stoichiometry so that the final copper oxide coating has the desired properties, e.g., electronic conductivity, stability, etc. Chloride, nitrate, sulfate, organic complexes as set forth above and their hydrate components are particularly useful additional components with oxide, peroxide and carbonates being also useful. Care should be exercised in choosing the additional component or components for use. For example, the components should be sufficiently compatible with the cuprous chloride so that the desired conductive copper oxide coating can be formed.

The use of an additional component is an important feature of certain aspects of the present invention. First, it has been found that such components can be effectively and efficiently incorporated into the copper oxide-containing coating. In addition, such additional components act to provide copper oxide-containing coatings with excellent electronic properties referred to above, morphology and stability.

Any suitable interacting-forming component may be employed in the iron oxide products and processes of this invention. Such interacting-forming component should provide sufficient concentration so that the final iron oxide coating has the desired properties, e.g., magnetic, high permeability, stability, for example, nickel, manganese or zinc components. Preferred iron component oxide precursors are set for above and include the halide, preferably the chlorides, organic complexes, such as low molecular poly functional organic acids, complexes, such as low molecular weight, ketone components, preferably 2, 4, ketones, benzylates and the like. The preferred interacting components are those that provide for optimum oxide incorporation while minimizing dopant precursor losses, particularly under the preferred process condition as set forth herein. Oxides or suboxides can also be used where dopant incorporation is accomplished during the oxidation sintering contacting step.

The use of an interacting component is an important feature of certain aspects of the present invention. First, it has been found that interacting components can be effectively and efficiently incorporated into the iron oxide-containing coating. In addition, such interacting components act to provide iron oxide-containing coatings with good magnetic properties referred to above, morphology and stability.

The liquid, e.g., molten, composition which includes transition metal chloride may, and preferably does, also include the interacting component. In this embodiment, the interacting component or components are preferably soluble and/or dispersed homogeneously and/or atomized in the composition. Vaporous mixtures of transition metal chloride and interacting components may also be used. Such compositions are particularly effective since the amount of interacting component in the final transition metal oxide coating can be controlled by controlling the make-up of the composition. In addition, both the transition metal chloride and interacting component are deposited on the substrate in one step. Moreover, if stannous fluoride and/or stannic fluoride are used, such fluorine components provide the dopant and are converted to tin oxide during the oxidizing agent/substrate contacting step. This enhances the overall utilization of the coating components in the present process. Particularly useful compositions comprise about 50% to about 98%, more preferably about 70% to about 95%, by weight of stannous chloride and about 2% to about 50%, more preferably about 5% to about 30%, by weight of fluorine component, in particular stannous fluoride.

In addition, if zinc chlorides are used, such chloride components provide the dopant and are converted to oxides during the oxidizing agent/substrate contacting step. This enhances the overall utilization of the coating components in the present process. Particularly useful final zinc oxide compositions comprise about 0.1% to about 5%, more preferably about 0.5% to about 3%, by weight of dopant oxide.

In addition, if cuprous chloride and yttrium chloride, and a barium oxide precursor (dispersed) are used, such components provide the conductivity stoichiometry and are converted to copper oxide during the oxidizing agent/substrate contacting step. This enhances the overall utilization of the coating components in the present process. Particularly useful compositions produce a yttrium to barium to copper oxide atomic weight ratio of 1,2,3 or 1,2,4.

As described herein, a preferred class of superconductors are the 1:2:3 and 1:2:4 superconductors of yttrium, barium and copper. In addition, thallium, barium, calcium and copper oxide in an atomic weight ratio of about 2:2:2:3 are also preferred. Bismuth based copper oxide conductors are further examples of conductors within the scope of this invention. The films prepared by the process of this invention enhance the current carrying capability of the conductors, can reduce grain boundary current carry effects or provide improved control of oxidation and/or annealing conditions and uniformity, including the requisite atomic weight stoichiometry.

In addition, if chlorides or organic precursors of iron are used, such precursor components are converted to oxides during the oxidizing agent/substrate contacting step. This enhances the overall utilization of the coating components in the present process.

In one embodiment, a vaporous transition metal chloride composition is utilized to contact the substrate, and the composition is at a higher temperature than is the substrate. The make-up of the vaporous transition metal chloride-containing composition is such that transition metal chloride condensation occurs on the cooler substrate. If the interacting component is present in the composition, it is preferred that such interacting component also condense on the substrate. The amount of condensation can be controlled by controlling the chemical make-up of the vaporous composition and the temperature differential between the composition and the substrate. This "condensation" approach very effectively coats the substrate to the desired coating thickness without requiring that the substrate be subjected to numerous individual or separate contactings with the vaporous transition metal chloride-containing composition. As noted above, previous vapor phase coating methods have often been handicapped in requiring that the substrate be repeatedly recontacted in order to get the desired coating thickness. The present "condensation" embodiment reduces or eliminates this problem.

The substrate including the transition metal chloride-containing coating and the interacting component-containing coating is contacted with an oxidizing agent at conditions effective to convert transition metal chloride to transition metal oxide, and form a conductive or ferro magnetic tin oxide coating on at least a portion of the substrate. Water, e.g., in the form of a controlled amount of humidity, is preferably present during the coated substrate/oxidizing agent contacting. This is in contrast with certain prior transition metal oxide coating methods which are conducted under anhydrous conditions. The presence of water during this contacting has been found to provide a doped tin oxide coating having excellent electrical conductivity properties.

Any suitable oxidizing agent may be employed, provided that such agent functions as described herein. Preferably, the oxidizing agent (or mixtures of such agents) is substantially gaseous at the coated substrate/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, either alone or as a component of a gaseous mixture, e.g., air.

The substrate may be composed of any suitable inorganic material and may be in any suitable form. Preferably, the substrate is such so as to minimize or substantially eliminate deleterious substrate, coating reactions and/or the migration of ions and other species, if any, from the substrate to the transition metal oxide-containing coating which are deleterious to the functioning or performance of the coated substrate in a particular application. However, controlled substrate reaction which provides the requisite stoichiometry can be used and such process is within the scope of this invention. In addition, it can be precoated to minimize migration, for example an alumina and/or a silica precoat and/or to improve wetability and uniform distribution of the coating materials on the substrate. Further, the transition metal oxide component, article can be further coated with a barrier film, organic and/or inorganic to minimize reaction of components such as corrosive gaseous materials with the final transition metal oxide component/article. In order to provide for controlled electrical conductivity in the conductive transition metal oxide coating, it is preferred that the substrate be substantially non-electronically conductive and/or non-deleterious reactive and/or substantial non-magnetic when the coated substrate is to be used as a component of an electric energy storage battery, acoustic device and/or magnetic device.. In one embodiment, the substrate is inorganic, for example metal, glass and/or ceramic and/or carbon. Although the present process may be employed to coat two dimensional substrates, such as substantially flat surfaces, it has particular applicability in coating three dimensional substrates. Thus, the present process provides substantial process advances as a three dimensional process. Examples of three dimensional substrates which can be coated using the present process include spheres, such as having a diameter of from about 1 micron to about 500 microns more preferably from about 10 microns to about 150 microns, extrudates, flakes, single fibers, fiber rovings, chopped fibers, fiber mats, porous substrates, irregularly shaped particles, e.g., catalyst supports, multi-channel monoliths tubes, conduits and the like. Acid resistant inorganic substrate, especially woven and non-woven mats of acid resistant glass fibers and particle type shapes set forth above, are particularly useful substrates when a doped tin oxide coated substrate is to be used as a component of a battery, such as a lead-acid electrical energy storage battery. More particularly, the substrate for use in a polymer composite can be in the form of particle type shapes set forth above and/or a body of woven or non-woven fibers, still more particularly, a body of fibers having a porosity in the range of about 60% to about 95%. Porosity is defined as the percent or fraction of void space within a body of fibers. The above-noted porosities are calculated based on the fibers including the desired fluorine doped transition metal oxide coating.

Another particularly unique coated three-dimensional substrate is a spherical particle, such as having a diameter of from about 1 micron to about 500 microns more preferably from about 10 microns to about 150 microns, particularly wherein the aspect ratio, i.e, the maximum particle width divided by the minimum particle width approaches 1 and/or is 1. The coated spherical particles are particularly useful in a number of applications, particularly lead acid batteries, including conductivity additives for positive active material, catalysts, resistance heating elements, electrostatic dissipation elements, electromagnetic interference fielding elements, electrostatic bleed elements, protective coatings, field dependent fluids and the like. In practice the spherical particles which are preferred for use in such applications in general have a roundness associated with such particles, generally greater than about 70% still more preferably, greater than about 85% and still more preferably, greater than about 95%. The spherical products of this invention offer particular advantages in many of such applications disclosed herein, including enhanced dispersion and rheology, particularly in various compositions such as polymer compositions, coating compositions, various other liquid and solid type compositions and systems for producing various products such as coatings and polymer composites.

A particularly unique embodiment of the present tin dioxide coated spherical particles of this invention is the ability to design a particular density for the sphere substrate through the use of or more open or closed cells, including micro and macro pores particularly, closed cell voids in such sphere which spheres are hereinafter referred to as hollow spheres. Thus such densities can be designed to be compatible and synergistic with other components used in a given application, particularly optimized for compatibility in liquid systems such as polymer coating compositions as set forth above. The average particle density can vary over a wide range such as densities of from about 0.1 g/cc to about 2.00 g/cc, more preferably from about 0.13 g/cc to about 1.5 g/cc, and still more preferably from about 0.15 g/cc to about 0.80 g/cc.

As set forth above, the spheres can be inorganic for example, carbon and/or an inorganic oxide. Typical examples of inorganic oxides which are useful as substrates include for example, substrates containing one or more alumino silicate, silica, sodium borosilicate, insoluble glass, soda lime glass, soda lime borosilicate glass, silica alumina, as well as such glasses and ceramics which are modified with, for example, another oxide such as titanium dioxide and/or small amounts of iron oxide. The preferred inorganic oxides for various applications, as well as the average particle size, density and additional components associated with the transition metal oxide coated spherical particle, are set forth below under lead acid batteries, catalysts, resistance heating elements, electrostatic dissipation elements, electromagnetic interference shielding elements, electrostatic bleed elements, protective coatings, field dependent fluids and the like.

A particularly unique coated three-dimensional substrate is a flake particle, such as having a diameter of from about 0.1 micron to about 100 microns more preferably from about 0.1 microns to about 30 microns, and still more preferably from about 0.1 microns to about 10 microns, particularly wherein the aspect ratio, i.e. the average particle length divided by the thickness of the particle is from about five to one to about 2,000 to 1, more preferably from about 20 to 1 to about 2,000 to 1 and still more preferably, from about 50 to 1 to about 1,000 to 1. Generally, the platelets will have a thickness varying from about 0.1 microns to about 10 microns, more preferably from about 0.1 micron to about 6 microns, more preferably from about 0.1 microns to about 10 microns, more preferably from about 0.1 micron to about 6 microns. The average length, i.e., the average of the average length plus average width of the platelet, i.e., flake, will generally be within the aspect ratios as set forth above for a given thickness. Thus for example the average length as defined above can from about 5 microns to about 3,500 microns, more typically from about 40 microns to about 3,200 microns. In general, the average length can vary according to the type of substrate and the method used to produce the platelet material. For example, C glass in general has an average length which can vary from about 200 microns up to about 3,200 microns, typical thicknesses of from about 1.5 to about 7 microns. Other platelet materials for example, hydrous aluminum silicate mica, in general can vary in length from about 5 to about 250 microns at typical thicknesses or from about 0.1 to about 4.0 microns, preferably within the aspect ratios set forth above. The coated platelet particles are particularly useful in a number of applications particularly lead acid batteries, including conductivity additives for positive active material, catalysts resistance heating elements, electrostatic dissipation elements, electromagnetic interference fielding elements, electrostatic bleed elements, protective coatings, field dependent fluids and the like. In practice the platelet particles which are preferred for use in such application sin general have an average length less than about 400 m microns and an average thickness of from about 0.1 to about 6 microns. As set forth above, the platelet substrates can be optimized for a particular application and the particular mechanical requirements associated with such end use application. For example, processing of the platelet filled matrix materials, for example a polymer matrix material may be optimized in platelet thickness for mechanical structural processing and by an aspect ratio to optimize the formation of for example a conductive platelet network within such matrix material. The platelet products of this invention offer particular advantages in many of such applications disclosed herein, including enhanced dispersions and rheology, particularly in various compositions such as polymer compositions, coating compositions, various other liquid and solid type compositions and systems for producing various products such as coatings and polymer composites.

The substrate for use in lead-acid batteries, because of availability, cost and performance considerations, preferably comprises acid resistant glass, more preferably in the form of fibers, flakes and other particulate as noted above. Ceramic and metal fibers, especially continuous fibers, are particularly useful substrates when the copper oxide coated substrate is to be used as a superconductor.

The substrate for use in lead-acid batteries is acid resistant. That is, the substrate exhibits some resistance to corrosion, erosion and/or other forms of deterioration at the conditions present, e.g., at or near the positive plate, or positive side of the bipolar plates, in a lead-acid battery. Although the fluorine doped transition metal oxide coating does provide a degree of protection for the substrate against these conditions, the substrate should itself have an inherent degree of acid resistance. If the substrate is acid resistant, the physical integrity and electrical effectiveness of the doped transition metal oxide coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-or T-glass to the conditions present in a lead-acid battery.

Typical compositions of E-glass and C-glass are as follows:

|  | Weight Percent | | |
| --- | --- | --- | --- |
|  | E-glass | C-glass | T-glass |
| Silica | 54 | 65 | 65 |
| Alumina | 14 | 4 | 6 |
| Calcia | 18 | 14 | 10* |
| Magnesia | 5 | 3 | — |
| Soda + Potassium Oxide | 0.5 | 9 | 13 |
| Boria | 8 | 5 | 6 |
| Titania + Iron Oxide | 0.5 | — | — |

*including MgO

Preferably the glass contains more than about 60% by weight of silica and less than about 35% by weight of alumina, and alkali and alkaline earth metal oxides.

The conditions at which each of the steps of the present process occur are effective to obtain the desired result from each such step and to provide a substrate coated with a transition metal oxide-containing coating. For example, the substrate/stannous chloride contacting and the substrate/dopant-forming component contacting preferably occur at a temperature in the range of about 250° C to about 375° C., more preferably about 275° C. to about 350° C. The amount of time during which stannous chloride and/or dopant-forming component is being deposited on the substrate depends on a number of factors, for example, the desired thickness of the transition metal oxide-containing coating, the amounts of stannous chloride and dopant-forming component available for substrate contacting, the method by which the stannous chloride and dopant-forming component are contacted with the substrate and the like. Such amount of time for transition metal halides preferably in the range of about 0.5 minutes to about 20 minutes, more preferably about 1 minute to about 10 minutes.

If the coated substrate is maintained in a substantially non-deleterious oxidizing environment, as previously set forth. For tin oxide coatings it is preferred that such maintaining occur at a temperature in the range of about 275° C. to about 375° C., more preferably about 300° C. to about 350° C. for a period of time in the range of about 0.1 minutes to about 20 minutes, more preferably about 1 minute to about 10 minutes. The coated substrate/oxidizing agent contacting preferably occurs at a temperature in the range of about 350° C. to about 600° C., more preferably about 400° C. to about 550° C., for a period of time in the range of about 0.1 minutes to about 10 minutes. A particular advantage of the process of this invention is the temperatures used for oxidation particularly tin oxide have been found to be lower, in certain cases, significantly lower, i.e., 50° to 100° C. than the temperatures required for spray hydrolysis. This is very significant and unexpected, provides for process efficiencies and reduces, and in some cases substantially eliminates, deleterious reactions and/or migration of deleterious elements from the substrate to the transition metal oxide layer. Excessive sodium migration, e.g., from the substrate, can reduce electronic conductivity.

For substrate/zinc chloride contacting, including for example the substrate/dopant-forming component, contacting preferably occurs at a temperature in the range of about 290° C. to about 600° C., more preferably about 310° C. to about 400° C. The amount of time during which zinc chloride and/or dopant-forming component is being deposited on the substrate depends on a number of factors, for example, the desired thickness of the zinc oxide-containing coating, the amounts of zinc chloride and dopant-forming component available for substrate contacting, the method by which the zinc chloride and dopant-forming component are contacted with the substrate and the like.

If the zinc chloride coated substrate is maintained in a substantially non-deleterious oxidizing environment, it is preferred that such maintaining occur at a temperature in the range of about 290° C. to about 600° C., more preferably about 310° C. to about 400° C. for a period of time in the range of about 0.05 or 0.1 minutes to about 20 minutes, more preferably about 0.5 or 1 minute to about 10 minutes. The coated substrate/oxidizing agent contacting preferably occurs at a temperature in the range of about 550° C. to about 700° C., more preferably about 600° C. to about 675° C., for a period of time in the range of about 0.05 or 0.1 minutes to about 10 minutes. Additional contacting at a higher temperature up to about 850° C. for a period of up to about 0.5 to about 2 hours can be used to fully develop the electrical conductivity properties. A particular advantage of the process of this invention is that the temperatures used for oxidation have been found to be lower, in certain cases, significantly lower, i.e., 50° to 200° C. than the temperatures required for spray hydrolysis. This is very significant and unexpected, provides for process efficiencies and reduces, and in some cases substantially eliminates, migration of deleterious elements from the substrate to the zinc oxide layer. Excessive ion migration, e.g., from the substrate, can reduce electronic conductivity depending on the substrate and processing condition. In addition, the oxidizing and or sintering steps can be combined with a carbon and/or sulfur source, such as to provide the desired oxides for developing enhanced conduction.

For the substrate/cuprous chloride contacting, for example in the presence of the substrate/additional component, contacting preferably occur at a temperature in the range of about 435° C. to about 630° C., more preferably about 450° C. to about 500° C. The amount of time during which cuprous chloride and/or dopant-forming component is being deposited on the substrate depends on a number of factors, for example, the desired thickness of the copper oxide-containing coating, the amounts of cuprous chloride and additional components available for substrate contacting, the method by which the cuprous chloride and additional components are contacted with the substrate and the like.

If the coated substrate is maintained in a substantially non-deleterious oxidizing environment, as previously set forth it is preferred that such maintaining occur at a temperature in the range of about 435° C. to about 630° C., more preferably about 450° C. to about 500° C. for a period of time in the range of about 0.1 minutes to about 20 minutes, more preferably about 1 minute to about 10 minutes. The coated substrate/oxidizing agent contacting preferably occurs at a temperature in the range of about 500° C. to about 900° C., more preferably about 700° C. to about 850° C., for a period of time in the range of about 1 minute or up to about 4 hours. Additional contacting, i.e. annealing, of from about 450° C. up to about 650° C. can be used to develop optimum conductor properties. A particular advantage of the process of this invention is that the temperatures used for oxidation have been found to be lower, in certain cases, significantly lower, i.e., 50° to 100° C. or even up to 200° C. than the temperatures required for conventional sintering. This is very significant and unexpected, provides for process efficiencies and reduces, and in some cases substantially eliminates, deleterious reactions and/or migration of deleterious elements from the substrate to the copper oxide layer. Excessive reaction and/or migration, e.g., from or by the substrate, can reduce electronic conductivity depending on the substrate processing conditions. In addition, the oxidizing and/or sintering steps can be combined with a staged oxygen annealing step to develop optimum properties for example low to high or high to low concentrations of oxygen.

For the substrate/iron chloride precursor contacting for example, in the presence of the substrate/interacting forming component, contacting preferably occurs at a temperature in the range of about 30° C. to about 450° C., more preferably about 35° C. to about 300° C. The amount of time during which iron chloride precursor and/or interacting-forming component is being deposited on the substrate depends on a number of factors, for example, the desired thickness of the iron oxide-containing coating, the amounts of iron chloride precursor and interacting-forming component available for substrate contacting, the method by which the iron chloride and dopant-forming component are contacted with the substrate and the like.

If the coated substrate is maintained in a substantially non-deleterious oxidizing environment, it is preferred that such maintaining occur at a temperature in the range of about 50° C. to about 450° C., more preferably about 100° C. to about 300° C. for a period of time in the range of about 100° C. to about 300° C. for a period of time in the range of about 0.05 or 0.1 minutes to about 20 minutes, more preferably about 0.5 or 1 minute to about 10 minutes. The coated substrate/oxidizing agent contacting preferably occurs at a temperature in the range of about 60° C. to about 1000° C., more preferably about 750° C. to about 900° C., for a period of time in the range of about 0.05 or 0.1 minutes to about 10 minutes. Additional contacting at a higher temperature up to about 850° C. for a period of up to about 0.5 to about 2 hours can be used to fully develop the electrical conductivity properties. A particular advantage of the process of this invention is that the temperatures used for oxidation have been found to be lower, in certain cases, significantly lower, i.e., 50° to 200° C. than the temperatures required for spray hydrolysis. This is very significant and unexpected, provides for process efficiencies and reduces, and in some cases substantially eliminates, migration of deleterious elements from the substrate to the iron oxide layer. Excessive ion migration, e.g., from the substrate, can reduce permeability depending on the substrate and processing condition. In addition, the oxidizing and or sintering steps can be staged with successive reductions in the oxygen content of the gas and/or with a carbon source, to provide the desired oxygen content for developing enhanced magnetic properties.

Ferrite is a generic term describing a class of magnetic oxide compounds that contain iron oxide as a major component. There are several crystal structure classes of compounds broadly defined as ferrites, such as spinel, magnetoplumbite, garnet, and perovskite structures.

Although there are many characterizations specific to a given application, one property is shared by all materials designed as ferrites, namely the existence of a spontaneous magnetization (a magnetic induction in the absence of an external magnetic field).

The magnetic properties of ferrites derive directly from the electron configuration of the ions and their interactions with each other. Although the specific structures differ, they can all generally be considered to be composed of two sublattices: a rigid anion lattice composed of the relatively large oxygen anions and the cation sublattice formed by the filing of holes (interstitial sites) with the smaller cations.

Spinel ferrites has the general composition $AB_2X_4$. The structure is a cubic close packing of the anions (X), with a variety of A and B cations capable of filling the interstitial sites. The smallest crystallographic unit cell which has the required cubit symmetry contains eight formula units of $AB_2X_4$. Each unit cell has two types of interstitial sites that can be occupied by the A and B cations.

A wide variety of transition metal cations can fit into these interstitial sites. Thus it becomes possible to make a large number of spinel ferrite compounds, each having specific magnetic interactions.

A great variety of oxide materials form the spinel structure with nickel-zinc-ferrite, $Ni_{1-x}Zn_xFe_{2\ to\ 5}O_4$, and manganese-zinc ferrite, being preferred.

Many of the nickel-zinc-ferrites are formulated with an iron deficiency in order to keep the magnetic losses low and the resistivity high ($>10^6$ ohm cm): The manganese-zinc-ferrites, on the other hand, have a slight excess of iron in order to optimize permeability and magnetic saturation.

It is preferred to make cubic spinel ferrite materials which have the highest inductance (high relative permeability) and are relatively easy to magnetize and demagnetize as high frequencies. These materials are used as inductors and high frequency transformers. Materials with the highest permeability are those for which the anisotropy constant $K_1$ is approximately zero and the compositional regions where $K_1$ is very low have been determined.

In addition to the major crystal chemical interactions, a number of dopants have specific effects on the magnetic properties of spinel ferrites. For example, the addition of small amounts of CaO (0.1 mol %) and $SiO_2$ (0.02 mol %) greatly reduce the eddy current losses in ferrites. Silica effects density, power losses, and microstructure of manganese-zinc-ferrites. Other dopants such as $B_2O_3$, $ZnO_2$ and $TiO_2$ have effects on the temperature coefficient of permeability and permeability disaccommodation.

In addition to the above spinel ferrited hexagonal ferrites are a group of ferromagnetic oxides in which the principal component is $Fe_2O_3$ in combination with a divalent oxide (BaO, SrO, or PbO and a divalent transition metal oxide (e.g., $BaZn_2Fe_{16}O_{27}$. Most hexagonal ferrite materials are used as permanent magnet materials.

In contrast to the spinel ferrites, where the object is to produce a material with the lowest possible value of the magnetocrystalline anisotropy (typically $0-10^{-11}$ J/cm$^3$ at room temperature) in order to maximize permeability and reduce hysteresis losses, the M-type hexagonal ferrites are useful because of their high anisotropic value (typically $3\times10^{-1}$ Jcm$^3$).

The garnets represent another class of compounds having the general structure $M_3Fe_5O$. The unit cell within the structure there are 24 tetrahedral and 16 octahedral sites. These sites can accommodate the small Fe cation and other cations of similar size. Additionally, there are 24 dodecahedral sites that can accommodate Y, La, Ca, the rare earths, and other large cations.

Again, as was the case with both the hexagonal and spinel ferrites, there are two magnetic sublattice opposed to each other. The wide variety of cations that can be substituted into the lattice allow specific material properties to be engineered. The most widely known magnetic compounds having this structure are yttrium-iron-garnet, $Y_3Fe_5O_2(25)$, and gadolinium-iron-garnet, $Gd_3Fe_5O$.

The iron oxide coated substrate of the present invention may be, for example a magnetic material itself, a catalyst itself or a component of a composite together with one or more matrix materials. The composites may be such that the matrix material or materials substantially totally encapsulate or surround the coated substrate, or a portion of the coated substrate may extend away from the matrix material or materials.

The transition metal oxide coated substrates, such as the doped tin oxide and zinc oxide coated substrates, of the present invention may be, for example, a catalyst itself or a component of a composite together with one or more matrix materials. The composites may be such that the matrix material or materials substantially totally encapsulate or surround the coated substrate, or a portion of the coated substrate may extend away from the matrix material or materials.

Any suitable matrix material or materials may be used in a composite with the transition metal oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene difluoride, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamine-formaldehyde polymers, and urea-formaldehyde polymers.

When used in battery applications, the present doped transition metal oxide coated substrate is preferably at least partially embedded in a matrix material. The matrix material should be at least initially fluid impervious to be useful in batteries. If the fluorine doped transition metal oxide coated substrate is to be used as a component in a battery, e.g., a lead-acid electrical energy storage battery, it is situated so that at least a portion of it contacts the positive active electrode material. Any suitable positive active electrode material or combination of materials useful in lead-acid batteries may be employed in the present invention. One particularly useful positive active electrode material comprises electrochemically active lead oxide, e.g., lead dioxide, material. A paste of this material is often used. If a paste is used in the present invention, it is applied so that there is appropriate contacting between the fluorine doped transition metal oxide coated substrate and the paste.

In order to provide enhanced bonding between the transition metal oxide coated substrate and the matrix material, it has been found that the preferred matrix materials have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene are more preferred for use as the present matrix material. Particularly preferred thermoset polymers include epoxies, phenol-formaldehyde polymers, polyesters, and polyvinyl esters.

A more complete discussion of the presently useful matrix materials for lead and battery applications is presented in Fitzgerald, et al U.S. Pat. No. 4,708,918, the entire disclosure of which is hereby incorporated by reference herein.

Various techniques, such as casting, molding and the like, may be used to at least partially encapsulate or embed the transition metal oxide coated substrate into the matrix material or materials and form composites. The choice of technique may depend, for example, on the type of matrix material used, the type and form of the substrate used and the specific application involved. Certain of these techniques are presented in U.S. Pat. No. 4,547,443, the entire disclosure of which is hereby incorporated by reference herein. One particular embodiment involves preimpregnating (or combining) that portion of the transition metal oxide coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as modified polypropylene, and has been found to provide improved bonding between the transition metal oxide coated substrate and the matrix material.

The bonding between the matrix material and the transition metal oxide coated substrate is important to provide improved properties. In order to provide for improved bonding of the transition metal oxide coating (on the substrate) with the matrix material, it is preferred to at least partially, more preferably substantially totally, coat the transition metal oxide coated substrate with a coupling agent which acts to improve the bonding of the transition metal oxide coating with the matrix. This is particularly useful when the substrate comprises acid resistant glass fibers. Any suitable coupling agent may be employed. Such agents preferably comprise molecules which have both a polar portion and a non-polar portion. Certain materials generally in use as sizing for glass fibers may be used here as a "size" for the transition metal oxide coated substrates such as glass fibers. The amount of coupling agent used to coat the coated fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. U.S. Pat. No. 4,154,638 discloses one silane-based coupling agent adapted for use with transition metal oxide surfaces. The entire disclosure of this patent is hereby expressly incorporated by reference herein.

In yet another embodiment, a coated substrate including transition metal oxide, preferably electronically conductive transition metal oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of an electrical field including photo induced and/or electrical and/or magnetic field current in proximity to the component. Thus, the transition metal oxide, preferably on a substantially non-electronically conductive substrate, e.g., a catalyst support, can provide an effective and efficient catalyst for chemical reactions, including those which occur or are enhanced when an electric field and/or current and/or magnetic field is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to electronic properties and/or morphology and/or stability, of the present transition metal oxides plays an important role in making useful and effective catalyst materials, particularly the higher surface area attainable transition metal oxide materials prepared in accordance with this invention, especially when compared to prior art processes which produce very low surface areas. A particularly useful class of chemical reactions are those involving chemical oxidation or reduction. For example, an especially useful and novel chemical reduction includes the chemical reduction of nitrogen oxides, to minimize air pollution, with a reducing gas such as carbon monoxide, hydrogen and mixtures thereof and/or an electron transferring electrical field. A particularly useful chemical oxidation application is a combustion, particularly catalytic combustion, wherein the oxidizable compounds, i.e., carbon monoxide and hydrocarbons are combusted to carbon dioxide and water. For example, catalytic converters are used for the control of exhaust gases from internal combustion engines and are used to reduce carbon monoxide and hydrocarbons from such engines. Of course, other chemical reactions, e.g., hydrocarbon reforming, dehydrogenation, such as alkylaromatics to olefins, olefins to dienes, alcohols to ketones hydrode-cyclization, isomerization, ammoxidation, such as with olefins, aldol condensations using aldehydes and carboxylic acids and the like, may be promoted using the present catalyst component, transition metal oxide-containing coated substrates. As noted above, it is preferred that the transition metal oxide in the catalyst component, transition metal oxide-containing substrates be electronically conductive. Although fluorine doped tin oxide is particularly useful, other dopants may be incorporated in the present tin oxide catalyst materials to provide the transition metal oxide with the desired electronic properties. For example, antimony may be employed as a tin oxide dopant. Such other dopants may be incorporated into the final catalyst, transition metal oxide-containing coated substrates, such as cobalt as a zinc oxide dopant using one or more processing techniques substantially analogous to procedures useful to incorporate dopants, e.g., as described herein.

Particularly useful chemical reactions as set forth above include the oxidative dehydrogenation of ethylbenzene to styrene and 1-butene to 1,3-butadiene; the ammoxidation of propylene to acrylonitrile; aldol condensation reactions for the production of unsaturated acids, i.e., formaldehyde and propionic acid to form methacrylic acid and formaldehyde and acetic acid to form acrylic acid; the isomerization of butenes; and the oxidation of methane to methanol. It is believed, without limiting the invention to any specific theory of operation, that the stability of the catalysts, the redox activity of the transition metal oxide, i.e., stannous, stannic, mixed transition metal oxide redox couple, morphology and the transition metal oxide catalytic and/or support interaction with other catalytic species provides for the making of useful and effective catalyst materials. In certain catalytic reactions, such as $NO_x$ reduction and oxidative dehydrogenation, it is believed that lattice oxygen from the regenerable transition metal oxide redox couple participates in the reactions.

The transition metal oxide-containing coated substrates of the present invention may be employed alone or as a catalyst and/or support in a sensor, in particular gas sensors. Preferably, the coated substrates includes a sensing component similar to the catalyst component, as described herein.

The present sensors are useful to sense the presence or concentration of a component, e.g., a gaseous component, of interest in a medium, for example, hydrogen, carbon monoxide, methane and other alkanes, alcohols, aromatics, e.g., benzene, water, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and zinc. The signal provided may be the result of the component of interest itself impacting the sensing component and/or it may be the result of the component of interest being chemically reacted, e.g., oxidized or reduced, in the presence of the sensing component.

The stability and durability for the present transition metal oxide materials are believed to make them very useful as catalysts, sensors, and supports for additional catalysts and sensors in aggressive and/or harsh environments, particularly acid, i.e., sulfur and nitrogen acid environments.

Any suitable catalyst component (or sensing component) may be employed, provided that it functions as described herein. Among the useful metal catalytic components and metal sensing components are those selected from components of the tins, the rare earth metals, certain other catalytic components and mixtures thereof, in particular catalysts containing gold, silver, copper, vanadium, chromium, cobalt molybdenum, tungsten, zinc, indium, the platinum group metals, i.e., platinum, palladium and rhodium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, etc.

The preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials, including rings, saddles, stars, etc.. A particularly useful catalyst support is a multi-channel monolith such as one made from cordierite which has been coated with alumina. The catalyst materials can be used as is or further processed such as by sintering of powered catalyst materials into larger aggregates. The aggregates can incorporate other powders, for example, other oxides, to form the aggregates.

Multi-channel monoliths are useful for a variety of applications and are particularly useful as catalyst supports and heating applications. The monolithic support is composed of many parallel channels. The channels may be circular, hexagonal, square, triangular or sinusoidal. The inside edge length of the channels and their wall thickness can be controlled during the fabrication, along with the cell geometry. These factors determine the cell density and void fraction of the monolith, as well as the geometric surface area and hydraulic diameter of the monoliths. The external geometry of the monolith support is usually determined by the use. Particularly useful catalyst applications are the reduction of nitrogen oxide from combustion sources, i.e., power generation and nitric acid plants and the reduction of organic compounds, for example hydrocarbon and carbon monoxide emissions from emission sources, such as combustion sources, including gas turbine and internal combustion engine and their use in both stationary and mobile applications. The lengths of the channels typically range from 1 centimeter to 1 meter and monoliths with diameters up to 2 meters have been formed. The external geometry of the monolith can vary and typically includes geometrical shapes, i.e., circular, square and oval. The geometric shape can be defined by its length, width, height coordinates and such coordinates can have dimensions generally from about 3 centimeter to about 130 centimeters, more preferably, from about 5 centimeters to about 60 centimeters. The geometric shape is generally selected according to the requirements for the particular process in which the monolith is to be used. While the cell density and/or wall thickness can have a great number of variations, the manufacturing methods, presently used to produce monoliths generally have minimum wall thickness of about 0.1 mm and cell density of less than 160 cells per centimeter square. Typical wall thicknesses are from about 0.15 mm to about 1.0 mm more preferably from about 0.2 mm to about 0.6 mm. Typical cell densities are from about 15 cells per square cm to about 65 cells per square cm, more preferably from about 20 cells per square cm to about 50 cells per square cm.

The microstructure or phase distribution of the walls of a monolith support are important in determining its physical properties. The arrangements and size of the crystal and glass phases, the pore structure and the chemical composition, all determine the thermal expansion, thermal conductivity, strength, melting point, surface area and other important physical properties. The microstructure of the final product depends on the raw material fabrication techniques, sintering temperatures and time, as well as phase equilibrium, kinetics of phase changes and grain growth.

An important physical property of monoliths is the degree of porosity. Porosity is controlled by the methods of fabrication, starting material and final sintering time and temperatures. The amount of porosity, i.e., the percentage of open space in the total volume, generally is from about 10% to about 65%, preferably from about 30% to about 55%. The amount of porosity, particularly the shape and size distribution of the wall porosity, affects such properties as density, thermal conductivity and subsequent coat adhesion. Typically the average pore diameter is in the range of from about 1 to about 10 microns. It is generally important that a large fraction of the porosity have relatively large pores, for example from about 5 to about 15 microns, to obtain good adhesion of a subsequent surface coat on the monolith. An important property determined by porosity, particularly for high porosities, is the significant reduction in thermal conductivity of the monolith, particularly the monolith walls, in both heat flow parallel to cells as well as heat flow perpendicular to cells. The magnitude of reduction in thermal conductivity can be optimized and typically can be a reduction of about 50%, up to 80%, or even up to 90% or higher when compared to the solid non-porous inorganic support. As set forth above, thermal conductivity can be optimized for low thermal conductivity by the selection of ceramic starting materials, porosity forming components and concentration and geometry. Such optimization also takes into consideration the final end use application of the catalyst supported monolith. Porosity can also be increased by directly leeching the preformed monolith within an acid medium, i.e. nitric acid, to selectively remove ceramic constituents for example magnesia and alumina. Such leaching cannot only increase porosity but also the surface area of the monolith. Typical substrate surface areas can range from about 0.1 to about 2 meters square per gram up to about 20 or even up to about 40 or higher meters square per gram, with the higher areas generally resulting from leached and/or was coated monoliths.

It is generally preferred to have a high surface area in order to optimize catalyst activity for a particular catalyzed chemical reaction. As set forth above, the monolith surface area can be increased by, for example, leaching and/or by the application of a surface coating such as a wash-coat which provides for a high surface area surface on the monolith. It is preferred to incorporate a catalyst on a high surface area for improved overall catalyst effectiveness and activity. As set forth above, it is preferred to have macro pores when a subsequent surface coat is being applied to the monolith. Such subsequent coatings can include, for example, a barrier coat, a wash coat, and/or the transition metal oxide coating on the substrate surface. As set forth above, the inorganic substrates, can include a wide variety of materials. Particularly preferred inorganic oxides for use in the manufacture of monoliths are for example, cordierite, silicon carbide, silicon nitride, titania (such as anatase), alumina (preferably gamma alumina), titania and silica, magnesium aluminate spinel, mordenite, i.e., zeolite, silica, magnesia and mixtures thereof. The inorganic substrates, particularly the inorganic oxide monolith supports are particularly useful and can be coated with a transition metal oxide forming component and converted to a transition metal oxide.

For the coating of monoliths, the various processes set forth above can be utilized. For example, a monolith support of suitable width, length and cell density can be contacted with a transition metal oxide precursor powder, a powder solvent slurry and/or by vapor infiltration, including mist and droplets, preferably stannous chloride. The monolith after contacting with the transition metal oxide precursor containing compound is preferably equilibrated and maintained at conditions, sufficient to allow distribution of the transition metal oxide precursor forming compound over a plurality of the surfaces, particularly the internal cell, i.e., channel surfaces of the monolith. The monolith before, during or after equilibration can be contacted with a substantially non-deleterious gas, preferably inert, in order to minimize and/or reduce any blockage in the cells of the monolith. The viscosity of the precursor liquid can be adjusted to control depth of penetration into the monolith, particularly into the macro pores. As set forth above, a interacting component can be incorporated into the transition metal oxide forming component coating during the above processing steps. A particularly preferred coating is tin oxide particularly using stannous chloride as the forming components and a fluoride dopant. The monolith after coating with the transition metal oxide precursor compound can be subjected to oxidation conditions to convert the precursor compound to transition metal oxide. Particularly preferred transition metal oxide coatings are conductive transition metal oxide coatings.

The catalyst components (or sensing components) may be included with the coated substrate using any one or more of various techniques, e.g., conventional and well known techniques. For example, metal catalyst components (metal sensing components) can be included with the coated substrate by impregnation; electrochemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the transition metal oxide forming component is placed on the substrate. Thus, a catalyst material, such as a salt or acid, e.g., a halide and preferably chloride, oxy chloride and chloro acids, e.g., chloro platinic acid, of the catalytic metal, is incorporated into the transition metal chloride-containing coating of the substrate, prior to contact with the oxidizing agent, as described herein. This catalyst material can be combined with the stannous chloride and contacted with the substrate, or it may be contacted with the substrate separately from transition metal chloride before, during and/or after the stannous chloride/substrate contacting.

One approach is to incorporate catalyst-forming materials into a process step used to form a transition metal oxide coating. This minimizes the number of process steps but also, in certain cases, produces more effective catalysts. The choice of approach, however, is dependent on a number of factors, including the process compatibility of transition metal oxide and catalyst-forming materials under given process conditions and the overall process efficiency and catalyst effectiveness.

The catalyst support and/or transition metal oxide coated support can be coated with a material, such as a high surface area forming material, for example a wash coat in order to increase surface area. It is preferred to form a high surface area prior to incorporating the active catalyst material. Various conventional and well known techniques for catalyst incorporation can be used.

As in known in the art, most particulate supports can be made directly with high surface areas, however, monoliths, as set forth above, can have low surface areas, i.e., about 0.1 to about 2 meter square per gram. Such surface areas are less than optimized for catalytic activity. In order to increase surface area, particularly for monoliths, the support can be coated with a high surface area material, such as an oxide forming material, particularly gamma alumina.

The thickness of the wash coat is generally less than about 0.1 mm. More typically, less than about 0.05 mm on the basis of overall average thickness. The coating generally comprises macro pores in the range of about 2 to about 10 microns and meso pores of from about 100 to about 200 angstroms. The type of distribution of pore size is generally referred to as a bimodal pore distribution.

As set forth above, the catalyst support can be coated with materials to provide and/or enhance a particular property. In addition to surface area, coatings can also incorporate an active catalyst component. For example, zeolites can be coated on the surface of the catalyst support, using for example a silica binder generally in the range from about 10 to 40 wt % binder, more preferably from about 20 to about 30 wt % binder. The concentration of binder is selected to maximize the availability of zeolite sites and to preserve the integrity of the coating.

A wide variety of materials, for example, inorganic oxides, can be used in the manufacture of monoliths. As set forth above, it is preferred to reduce deleterious interactions between the substrate and the transition metal oxide coating on the substrate, i.e., a deleterious interaction which substantially reduces the conductivity and/or catalyst activity and/or activity maintenance for the particular application. In addition, it is preferred to reduce deleterious interactions between non-transition metal oxide coatings with the active catalyst component where such additional coatings are utilized in the preparation of the catalyst.

As set forth above, the monolith can be contacted with a transition metal oxide precursor, utilizing for example powder, slurry, vapor infiltration and the like, process to produce a coated substrate. In a preferred embodiment, the transition metal oxide precursor is converted to transition metal oxide followed by incorporation of the catalyst component. The catalyst component can be incorporated directly on the transition metal oxide surface and/or a coating such as a high surface area coating, can be applied to the transition metal oxide surface coating, prior to incorporation of the active catalyst component. In general, it is preferred to have a high surface area available for catalyst incorporation and dispersion, particularly for high activity catalysts used in high gas velocity type conversion processes. The selection of a coating such as a coating on the transition metal oxide surface, is in part a function of the chemical process, the chemical processing conditions, to which the catalyst surface is exposed. For example, deleterious reactions between the catalyst and/or coating, i.e., the formation of low temperature spinels, from the catalyst component and for example alumina component can reduce significantly both catalyst activity and activity maintenance. Such coatings are selected to reduce such deleterious interactions between the catalyst and coating and/or transition metal oxide surface. However, certain catalyst coating interactions, enhance catalyst activity conversion and activity maintenance. Such interactions are generally referred to as catalyst support interactions and/or strong catalyst support interactions. Catalyst components, coatings, including transition metal oxide coating, can be selected to enhance such catalyst support interactions.

As set forth above, the support including monoliths can be coated with a barrier type coating, prior to contacting with a transition metal oxide precursor and subsequent conversion to a transition metal oxide coating on the monolith. The barrier coat can reduce substantial deleterious substrate/transition metal oxide interaction, as well as, providing a definable surface, generally from a porosity stand point, to control and/or regulate the quantity of transition metal oxide precursor used to obtain a design average coating thickness, including reduced penetration into the pores of the monolith. In addition, a coating can be formed on the transition metal oxide surface to provide for improved catalyst performance, i.e., higher surface area, more effective dispersion of catalyst, interactions between the coating and catalyst which improves catalysts performance, i.e., catalyst coating interactions which improve catalyst performance and/or reduce deleterious interactions which substantially reduce overall catalyst performance. As set forth above, the transition metal oxide and added catalyst metal can be formed with or without the use of a coating on the transition metal oxide surface, with the use of a subsequent coating, i.e, a high surface area coating being a preferred approach to incorporate catalyst forming materials. The transition metal oxide coating, catalyst combinations, as set forth above, are preferred catalyst products of the present invention.

As set forth above, the transition metal oxide substrate can be contacted with the catalyst forming material to incorporate the catalyst material after the conversion of the transition metal oxide precursor to transition metal oxide. As set forth above, various techniques, e.g., conventional and well known techniques can be utilized, i.e., impregnation and deposition from salt mixtures. For example, the tungsten and molybdenum can be incorporated as a catalyst by impregnation using ammonium salts dissolved in base. In addition, vanadium, i.e., ammonium vanadate dissolved in for example, a poly functional acid such as oxalic acid can be used. Metals such as cobalt, nickel, iron and copper can be impregnated as a nitrate solution. The impregnated supports are typically dried and sintered at elevated temperature for a time sufficient to decompose the salt to the corresponding oxide. Conventional and well known techniques can be utilized for metals such as the incorporation of precious metals as catalyst. As set forth above, a preferred impregnation technique for precious metal particularly, platinum is the use of chloro platinic acid. The impregnation or other techniques to incorporate a catalyst material after the formation of the transition metal oxide coating, is particularly preferred when the substrate is a multi-channel monolith.

The transition metal oxide substrate products of this invention, particularly tin oxide, where such substrate is a monolith, can find particular utility as catalytic combusters, catalytic converters, particularly for combustion turbines and internal combustion engines and for nitrogen oxides reduction. A particularly preferred ceramic material contains cordierite preferably comprising a major amount of the monolith. Cordierite has been found to be particularly useful as a catalytic converter when combined for example with tin oxide and catalytic amounts of platinum, palladium, rhodium and mixtures thereof. Particularly preferred catalytic converters are such cordierite monoliths with a conductive tin oxide coating, a high surface area gama-alumina coating and catalytic effective amounts of platinum and/or palladium and/or rhodium.

In addition to catalytic and combustion converters, the catalyst products of this invention particularly tin oxide find particular utility in the reduction of nitrogen oxide, particularly from coal, oil, or gas fired stationary combustion sources. A particularly preferred substrate material in the form of a monolith is a titania based and/or containing substrate material, including mixtures of titania with other ceramic based materials, particularly inorganic oxides. Particularly preferred catalyst materials include vanadium, cobalt, copper, nickel, molybdenum, chromium, iron, and mixtures thereof. A particularly preferred catalyst material is vanadium and combinations of vanadium with chromium, and/or iron and/or molybdenum.

A particularly unique property of the ferro magnetic catalysts of this invention is the ability to be able to separate and recover catalysts from solution and/or other non-magnetic or low permeability solids by magnetic separation. This is particularly advantageous in slurry catalysts, such as in liquid systems, such as hydrocarbon and/or aqueous and/or combination systems. This property allows separation including separation from other non-magnetic solids and separate catalysts regeneration if required.

Another unique property is the ability to heat the electrically conductive and/or ferro magnetic catalyst by induction heating as more fully described below. This property allows for far superior temperature control and thermal efficiencies.

In addition, the ability to vary coating thickness and substrate composition allows designing catalyst for a given density, a feature important in gravity separation processes.

The transition metal oxide/substrate combinations, e.g., the transition metal oxide coated substrates, of the present invention are useful in other applications as well. Among these other applications are included porous membranes, resistance heating elements, electrostatic dissipation elements, electromagnetic interference shielding elements, protective coatings, field dependent fluids and the like.

In one embodiment, a porous membrane is provided which comprises a porous substrate, preferably an inorganic substrate, and a transition metal oxide-containing material in contact with at least a portion of the porous substrate. In another embodiment, the porous membrane comprises a porous organic matrix material, e.g., a porous polymeric matrix material, and a transition metal oxide-containing material in contact with at least a portion of the porous organic matrix material. With the organic matrix material, the transition metal oxide-containing material may be present in the form of an inorganic substrate, porous or substantially non porous, having a transition metal oxide-containing coating, e.g., an electronically conductive transition metal oxide-containing coating, thereon.

One particularly useful feature of the present porous membranes is the ability to control the amount of transition metal oxide present to provide for enhanced performance in a specific application, e.g., a specific contacting process. For example, the thickness of the transition metal oxide-containing coating can be controlled to provide such enhanced performance. The coating process of the present invention is particularly advantageous in providing such controlled coating thickness. Also, the thickness of the transition metal oxide-containing coating can be varied, e.g., over different areas of the same porous membrane, such as an asymmetric porous membrane. In fact, the thickness of this coating can effect the size, e.g., diameter, of the pores. The size of the pores of the membrane or porous substrate may vary inversely with the thickness of the coating. The coating process of the present invention is particularly useful in providing this porosity control.

A heating element, for example, a resistance heating element, is provided which comprises a three dimensional substrate having an electrically or electronically conductive transition metal oxide-containing coating on at least a portion of all three dimensions thereof. The coated substrate is adapted and structured to provide heat in response, that is, in direct or indirect response, to the presence or application of one or more force fields, for example, magnetic fields, electrical fields or potentials, combinations of such force fields and the like, therein or thereto. An example of such a heating element is one which is adapted and structured to provide heat upon the application of an electrical potential across the coated substrate. Heating elements which are adapted and structured to provide heat in response to the presence of one or more electrical currents and/or electrical fields and/or magnetic fields therein are included in the scope of the present invention. The heat may be generated resistively. In one embodiment, a flexible heating element is provided which comprises a flexible matrix material, e.g., an organic polymeric material in contact with a substrate having an electronically conductive transition metal oxide-containing coating on at least a portion thereof. The coated substrate is adapted and structured as described above.

In addition, an electrostatic dissipation/electromagnetic interference shielding element is provided which comprises a three dimensional substrate, e.g., an inorganic substrate, having an electrically conductive and/or ferromagnetic transition metal oxide-containing coating on at least a portion of all three dimensions thereof. The coated substrate is adapted and structured to provide at least one of the following: electrostatic dissipation and/or bleed and electromagnetic interference shielding.

A very useful application for the products of this invention is for static, for example, electrostatic, dissipation and shielding, particularly for ceramic and polymeric parts, and more particularly as a means for effecting static dissipation including controlled static charge and dissipation such as used in certain electro static painting processes and/or electric field absorption in parts, such as parts made of ceramics and polymers and the like, as described herein. The present products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be treated to improve overall performance effectiveness. A heating cycle is generally used to provide for product bonding to the parts. A particular unexpected advantage is the improved mechanical properties, especially compared to metallic additives which may compromise mechanical properties. In addition, the products of this invention can be used in molding processes to allow for enhanced static dissipation and/or shielding properties of polymeric resins relative to an article or device or part without such product or products, and/or to have a preferential distribution of the product or products at the surface of the part for greater volume effectiveness within the part.

The particular form of the products, i.e., fibers, flakes, particles, mats or the like, is chosen based upon the particular requirements of the part and its application, with one or more of flakes, fibers and particles, including spheres, being preferred for polymeric parts. In general, it is preferred that the products of the invention have a largest dimension, for example, the length of fiber or particle or side of a flake, of less than about 1/8 inch, more preferably less than about 1/64 inch and still more preferably less than about 1/128 inch. It is preferred that the ratio of the longest dimension, for example, length, side or diameter, to the shortest dimension of the products of the present invention be in the range of about 500 to 1 to about 10 to 1, more preferably about 250 to 1 to about 25 to 1. The concentration of such product or products in the product/carrier and/or mix is preferably less than about 60 weight %, more preferably less than about 40 weight %, and still more preferably less than about 20 weight %. A particularly useful concentration is that which provides the desired performance while minimizing the concentration of product in the final article, device or part.

The products of this invention find particular advantage in static dissipation parts, for example, parts having a surface resistivity in the range of about $10^4$ ohms/square to about $10^{12}$ ohms/square. In addition, those parts generally requiring shielding to a surface resistivity in the range of about 1 ohm/square to about $10^5$ ohms/square and higher find a significant advantage for the above products due to their mechanical properties and overall improved polymer compatibility, for example, matrix bonding properties as compared to difficult to bond metal and carbon-based materials. A further advantage of the above products is their ability to provide static dissipation and/or shielding in adverse environments such as in corrosive water and/or electro galvanic environments. As noted above, the products have the ability to absorb as well as to reflect electro fields. The unique ability of the products to absorb allows parts to be designed which can minimize the amount of reflected electro fields that is given off by the part. This latter property is particularly important where the reflected fields can adversely affect performance of the part.

A flexible electrostatic dissipation/electromagnetic interference shielding element is also included in the scope of the present invention. This flexible element comprises a flexible matrix material, e.g., an organic polymeric material, in contact with a substrate having an electrically conductive and/or ferro magnetic transition metal oxide-containing coating on at least a portion thereof. The coated substrate of this flexible element is adapted and structured as described above.

The present coating process is particularly suitable for controlling the composition and structure of the coating on the substrate to enhance the performance of the coated substrate in a given, specific application, e.g., a specific resistance heating electrostatic dissipation or electromagnetic interference shielding application.

The present transition metal oxide/substrate combinations and matrix material/transition metal oxide/substrate combinations, which have at least some degree of porosity, hereinafter referred to as "porous contacting membranes" or "porous membranes", may be employed as active components and/or as supports for active components in systems in which the transition metal oxide/substrate, e.g., the transition metal oxide coated substrate, is contacted with one or more other components such as in, for example, separation systems, gas purification systems, filter medium systems, flocculent systems and other systems in which the stability and durability of such combinations can be advantageously utilized.

Particular applications which combine many of the outstanding properties of the products of the present invention include porous and electro membrane separations for gas processing, food processing, textile/leather processing, chemical processing, bio medical processing and water treatment. For example, various types of solutions can be further concentrated, e.g., latex concentrated, proteins isolated, colloids removed, salts removed, etc. The membranes can be used in flat plate, tubular and/or spiral wound system design. In addition, the products of this invention can be used e.g., as polymeric composites, for electromagnetic and electrostatic interference shielding applications used for computers, telecommunications and electronic assemblies, as well as in low radar observable systems and static dissipation, for example, in carpeting and in lightening protection systems for aircraft.

Membranes containing voids that are large in comparison with molecular dimensions are considered porous. In these porous membranes, the pores are interconnected, and the membrane may comprise only a few percent of the total volume. Transport, whether driven by pressure, concentration, or electrical potential or field, occurs within these pores. Many of the transport characteristics of porous membranes are determined by the pore structure, with selectivity being governed primarily by the relative size of the molecules or particles involved in a particular application compared to the membrane pores. Mechanical properties and chemical resistance are greatly affected by the nature, composition and structure e.g., chemical composition and physical state, of the membrane.

Commercial micropore membranes have pore dimensions, e.g., diameters, in the range of about 0.005 micron to about 20 microns. They are made from a wide variety of materials in order to provide a range of chemical and solvent resistances. Some are fiber or fabric reinforced to obtain the required mechanical rigidity and strength. The operational characteristics of the membrane are defined sometimes in terms of the molecules or particles that will pass through the membrane pore structure.

Microporous membranes are often used as filters. Those with relatively large pores are used in separating coarse disperse, suspended substances, such as particulate contamination. Membranes with smaller pores are used for sterile filtration of gases, separation of aerosols, and sterile filtration of pharmaceutical, biological, and heat sensitive solutions. The very finest membranes may be used to separate, e.g., purify, soluble macromolecular compounds.

Porous membranes also are used in dialysis applications such a removing waste from human blood (hemodialysis), for separation of biopolymers, e.g., with molecular weights in the range of about 10,000 to about 100,000, and for the analytical measurements of polymer molecular weights. Microporous membranes also may be used as supports for very thin, dense skins or a containers for liquid membranes.

The ability of dense membranes to transport species selectively makes possible molecular separation processes such as desalination of water or gas purification, but with normal thicknesses these rates are extremely slow. In principle, the membranes could be made thin enough that the rates would be attractive, but such thin membranes would be very difficult to form and to handle, and they would have difficulty supporting the stresses imposed by the application. Conversely, microporous membranes have high transport rates but very poor selectivity for small molecules. Asymmetric membranes, for example made of the present combinations, in which a very thin, dense membrane is placed in series with a porous substructure are durable and provide high rates with high selectivity. Such asymmetric membranes and the use thereof are within the scope of the present invention.

Examples of applications for porous membranes include: separation of fungal biomass in tertiary oil recovery; concentration of PVC latex dispersions; desalination of sea water; enhancement of catecholamine determination; removal of colloids from high purity deionized water; treatment of wool scouring liquids; filtration of tissue homogenates; separation of antigen from antigen-antibody couple in immunoassay; purification of subcutaneous tissue liquid extracts; concentration of solubilized proteins and other cellular products; cell debris removal; concentration of microbial suspensions (microbial harvesting); enzyme recovery; hemodialysis; removal of casein, fats and lactose from whey; concentration of albumen; separation of skimmed milk; clarification of liqueur, fruit juices, sugar, and corn syrup; alcohol fermentation; sterilization of liquids, e.g., beer, wine; continuous microfiltration of vinegar; concentration and demineralization of cheese, whey, soy whey, vegetable extracts, and flavorings; sugar waste recovery; silver recovery from photo rinses; dewatering of hazardous wastes; removal of hydrocarbon oils from waste water; recovery and recycling of sewage effluent; recovery of dye stuffs from textile mill wastes; recovery of starch and proteins from factory waste, wood pulp, and paper processing; separation of water and oil emulsions; separation of carbon dioxide and methane; and catalytic chemical reactions.

As described above porous membranes can be used in a wide variety of contacting systems. In a number of applications, the porous membrane provides one or more process functions including: filtration, separation, purification, recovery of one or more components, emulsion breaking, demisting, flocculation, resistance heating and chemical reaction (catalytic or non-catalytic), e.g., pollutant destruction to a nonhazardous form. The resistance heating and chemical reaction functions (applications) set forth herein can be combined with one or more other functions set forth herein for the porous membranes as well as such other related porous membrane applications.

The porous membrane, in particular the substrate, can be predominately organic or inorganic, with an inorganic substrate being suitable for demanding process environments. The porous organic-containing membranes often include a porous organic based polymer matrix material having incorporated therein a three dimensional transition metal oxide-containing material, preferably including an electronically conductive transition metal binary oxide coating, more preferably incorporating a dopant and/or a catalytic species in an amount that provides the desired function, particularly electrical conductivity, without substantially deleteriously affecting the properties of the organic polymer matrix material. These modified polymer membranes are particularly useful in porous membrane and/or electromembrane and/or catalytic processes.

Examples of polymer materials useful in microporous membranes include cellulose esters, poly(vinyl chloride), high temperature aromatic polymers, polytetrafluoroethylene, polymers sold by E. I. DuPont Corporation under the trademark Nafion, polyethyelene, polypropylene, polystyrene, polyethylene, polycarbonate, nylon, silicone rubber, and asymmetric coated polysulfone fiber.

A very convenient application for the coating process and products of this invention is the production of a controlled coating, e.g., a thin coating of transition metal oxide-containing material, on an inorganic substrate, particularly a porous inorganic substrate, to produce a porous membrane. The process provides a new generation of membranes: porous membranes for contacting processes, e.g., as described herein. The selectively in filtration, particularly ultra and micro filtration, can also be enhanced by applying an electrical field and/or an electrical potential to the porous membrane. The electrical field and/or potential can be obtained using a two electrode electrical system, the membrane including a electronically conductive transition metal oxide-containing coating constituting one of the two electrodes, preferably the anode.

Porous multilayer asymmetric electronically conductive inorganic membranes, produced in accordance with this invention, are particularly advantageous for membrane applications. Among the advantages of such membranes are: stability at high temperature and/or at large pressure gradients, mechanical stability *reduced and even substantially no compaction of the membrane under pressure), stability against microbiological attack, chemical stability especially with organic solvents, steam sterilization at high temperatures, backflush cleaning at pressures of up to 25 atm, and stability in corrosive and oxidation environment.

A membrane can be classified as a function of the size of the particles, macromolecules and molecules separated. Micron sized porous ceramics for filtration processes can be prepared through sintering of appropriate materials as set forth herein for the manufacture of sensors. However, the preferred process for membrane-based microfiltration, ultrafiltration and reverse osmosis is to provide inorganic layers with ultrafine pores and thickness small enough to obtain high flux through the membrane, particularly membranes including transition metal oxide-containing coatings.

With this type of asymmetric membrane, separation processes are pressure driven. Another factor is the interaction at the membrane interface between the porous material and the material to be processed. As noted above, selectivity can be enhanced by applying an electrical field onto the surface of the membrane. The electrical field is obtained using a two electrode electrical device; the conductive membrane constituting one of the two electrodes (anode or cathode— preferably anode). Such porous membranes can e obtained with one or more electronically conductive transition metal oxide-containing thin layers on a porous substrate. Conductive transition metal oxide combined with other metal oxide mixtures also provide improved properties for porous membranes and exhibit electronic conductivity, as well as other functions, such as catalysts or resistance heating.

As set forth above, porous membranes with inorganic materials can be obtained through powder agglomeration, the pores being the intergranular spaces. Conflicting requirements such as high flow rate and mechanical stability can be achieved using an asymmetric structure. Thus, an inorganic porous membrane is obtained by superimposing a thin microporous film, which has a separative function, over a thick microporous support. For example, conductive transition metal oxide coating onto the surface of filter media can be used as well as onto the surface of flat circular alumina plates. Coated alumina membranes supported on the inner part of sintered alumina tubes designed for industrial ultrafiltration processes can be used. Tube-shaped supports can be used with varying different chemical compositions, such as oxides, carbides, and clays. Coating of a homogeneous and microporous transition metal oxide-containing layer depends on surface homogeneity of the support and on adherence between the membrane and its support. Superior results can be obtained with particulate alumina. The inner part of the tube has a membrane comprising a layer, e.g., in the range of about 10 to about 20 microns thick, with pores, e.g., having diameters in the range of about 0.02 to about 0.2 microns sized for microfiltration purposes. The main feature of such a membrane is uniform surface homogeneity allowing for the transition metal oxide-containing coating to be very thin, e.g., less than about one micron in thickness.

The products of this invention as described herein, are particularly useful for resistance heating applications. It has been found that the coated three dimensional and/or flexible substrates particularly spheres, flakes, fibers, fiber rovings, chopped fibers, and fiber mats, can be incorporated into polymeric matrix materials, particularly thermoplastic, thermoset and rubber based polymeric materials, as describe herein. The transition metal oxide coated substrates can be, for example, E, C, S, or T glass, silica, silica alumina, silica alumina boria, silicon carbide or alumina as example fibers, rovings, mats, chopped mats, etc. What is unexpected is the improved mechanical properties, e.g., strength coating adhesion and the like, of the coated substrates relative to the prior art substrates coated using spray pyrolysis techniques and the improved control over coating thickness to match conductivity requirements for a given resistance heating application. Whereas for many low to moderate temperature applications, organic polymer matrix materials are preferred, three dimensional products comprising, preferably primarily comprising flexible or rigid inorganic substrates coated with transition metal oxide-containing coatings have excellent high temperature performance characteristics useful, for example, in high temperature resistance heating of liquids and gases, such as air, by contact with or through (i.e., porous) such three dimensional products. Typical resistance heating applications include: heating elements or units of electric heating devices, devices for culinary purposes, warming tables, therapeutic heaters, deicing devices such as electrically heated polymer composites, low-temperature ovens such as driers, high temperature heating of gases, liquids, etc.

A very useful application set forth above, is the heating of gases, particularly, the high temperature heating of gases. The heating of gases can include the direct and/or indirect heating of the gases, for example, the gases can be in direct or indirect heat exchange relationship with the heated transition metal oxide surface. In addition, the heated transition metal oxide surface can be in direct and/or indirect heat relationship with another surface which interacts with the gas to increase in temperature of the gases. For example, a gas such as an oxygen containing gas, i.e., air, can be contacted directly with the transition metal oxide coating on the substrate or a coating, such as a high thermal conductivity coating, which is in heat exchange relationship with the transition metal oxide coating, for example, another oxide coating, such as, alumina.

In addition to the direct and/or indirect heating of gases, particularly non-reactive gases and/or non-combustible gases, the products of this invention are particularly useful in heat exchange relationship with chemically reactive including combustible gases. In a typical application, the gas is heated (direct and/or indirect) to a temperature effective to initiate reaction and/or combustion of such gases which reaction if exothermic will produce heat thereby increasing the overall temperature of the gases and heated surfaces, particularly downstream surfaces. A particularly useful application of the above products is in the combustion of gases, particularly combustion converters including catalytic converters as described above under catalyst products and applications. In the various applications set forth above for the heating of gases, a particularly preferred substrate is a multi-cell/channel monolith, as set forth and described above. The multi-cell/channel monolith has excellent mechanical properties and is particularly useful for high gas velocity type applications, i.e, in the treatment of combustion gasses.

The use of a monolith substrate in the resistance heating of gases provides a unique synergy with the transition metal oxide coating, optionally containing a catalyst material. As set forth above, the porosity of a monolith can be controlled and increased and/or maximized as compared to the void free inorganic substrate material. The effect of increasing porosity is to reduce the thermal conductivity of the substrate which can reduce directionally the heat flow from the transition metal oxide coating. This is particularly important when gases are heated directly/indirectly and/or through combustion type reactions. It is preferred to reduce the thermal conductivity of the monolith substrate while still maintaining the mechanical properties required for the monolith in the particular heating application. In addition to reducing thermal conductivity by increasing the porosity of the substrate, the transition metal oxide coating can be coated with a coating having a higher thermal conductivity than the monolith substrate preferably a significantly higher thermal conductivity coating than the monolith substrate. Thus it is preferred to reduce and/or minimize the thermal conductivity between the monolith and the conductive transition metal oxide coating. In addition, it is preferred to increase and/or maximize the thermal conductivity of the outer surface of the transition metal oxide coating, i.e., not facing the monolith substrate, such as through the use of a thermal conductivity coating and/or by direct heat exchange relationship with the incoming gases and/or by the catalytic combustion of incoming reactive gasses. A particularly preferred coating for increasing thermal conductivity is alumina, particularly gamma alumina.

The reduction and/or minimizing of the thermal conductivity of the monolith substrate, particularly through control of porosity is particularly important when the monolith is combined with a catalyst material and such catalyst material is heated to temperature in order to promote an exothermic chemical reaction including the combustion of gases. For example, in the combustion of automotive exhaust gases, the incoming gases after the start of the internal combustion engine are at too low a temperature to be efficiently combusted over the catalyst. Typically, it may take from 2 to 3 minutes to obtain catalyst light off, defined as a 50% conversion of combustible gases to carbon dioxide and water. Such emissions resulting from the first three minutes of operation of a cold internal combustion engine can produce significant quantities of uncombusted carbon monoxide and hydrocarbons. Thus, the rapid heating of the transition metal oxide coating and the subsequent rapid heating of the catalyst material, can be done in a time to allow the heat directionally to be inputted to the catalyst material for initiating combustion or chemical reaction including the exhaust gases. The rate of heating of the transition metal oxide surface is in general a function of its conductivity or its reciprocal resistivity, voltage, applied current including the power factor and heat losses. As set forth above, it is preferred to reduce and/or minimize heat losses to the monolith substrate while directionally increasing and/or maximizing the heat flux to the gas and/or gas contacting surface and/or catalyst for initiating or continuing the exothermic chemical reaction including catalytic combustion type processes. The catalyst surface temperature is particularly important for initiating reaction, continuing the reaction and effectively utilizing the heats of combustion. In order to initiate a chemical reaction, particularly, a combustion reaction, such as in a catalytic convertor, it is preferred to have a surface and/or catalyst heat up rate which will allow for rapid initiation of the exothermic reaction. Typical heat up rates for transition metal oxide surfaces is from about 100° C. per second up to about 700° C. per second. Typically, a heat up rate of about 150° C. per second to about 450° C. per second will achieve a rapid catalyst and/or surface heat transfer to initiate chemical reactions including combustion. As set forth above, the heat up rates will be in part determined by the conductivity and other electrical components. Depending upon the application and the requirements of voltage, current and overall power requirements, the conductivity/resistivity of the transition metal oxide coating, can be controlled to design requirements. For example, the dopant level can be increased and/or decreased to obtain a design bulk conductivity. In addition, the thickness of the transition metal oxide coating can be varied and/or a degree of coating substrate interaction can be introduced into the coating design conductivity. In addition, other metal compounds, such as metal oxides, for example, copper, iron can be incorporated into for example a tin oxide coating to, for example, increase the resistivity of the coating for a particular application design requirement. In the case of the latter, it is preferred to have a uniform change in resistivity as opposed to the presence of insulating occlusions from the reaction of a component such as an oxide forming component with, for example, the transition metal oxide forming compound. As set forth above, it is preferred to reduce substantial deleterious interaction of substrate, coatings and catalyst which can adversely affect the design conductivity/resistivity for the particular heating application, including deleterious interactions that may affect the activity and/or activity maintenance of the resistively heated catalyst.

For heating applications where a catalyst material is associated with the transition metal oxide coated substrate, particularly for combustion applications, the transition metal oxide surface of the monolith can be electrically heated such as described above. When an applied potential across the monolith is used for resistance heating, typical and conventional contacts of the end surfaces of the monolith can be used, such as a metal coating on the monolith end surfaces by metal flame spraying. For automotive applications, the resistively heated catalysts of this invention can be configured or adapted for use in conventional catalyst canisters at the same or approximately the same dimensions used in conventional monolith automotive catalysts. The particularly unique features of the resistively heated catalyst, is the fast initiation of catalytic, reactions including combustion reaction when compared to the catalyst without being resistively heated.

Another very useful application for the products of this invention is for the joining of parts, particularly polymeric parts, and as a means for effecting the sintering or curing of parts, such as ceramics, curable polymers, for example thermoset and rubber based polymers and the like. The products can be incorporated directly into the polymer or ceramic and/or a carrier such as a cured or uncured polymer based carrier or other liquid, as for example in the form of a liquid, paste, hot melt, film and the like. These product/ carrier based materials can be directly applied to parts to be joined and resistance heating particularly induction heating used to raise the temperature and bond the parts together at a joint such as through polymer melting and/or curing. A particular unexpected advantage is the improved mechanical properties, especially compared to metallic susceptors which may compromise mechanical properties. In addition, the products of this invention can be used in molding processes to preferentially allow the rapid heating and curing of polymeric resins, and/or to have a preferential distribution of the products at the surface of the parts for subsequent joining of parts. The particular form of the products, i.e., fibers, flakes, particles, mats or the like, is chosen based upon the particular requirements of the part and its application, with one or more of flakes, fibers and particles being preferred for joining or bonding parts. In general, it is preferred that the products of the invention have a largest dimension, for example the length of a fiber or side of a flake, of less than about ⅛ inch, more preferably less than about 1/64 inch and still more preferably less than about 1/128 inch. The concentration of such product or products in the product/carrier and/or mix is preferably less than about 50 weight %, more preferably less than about 20 weight %, and still more preferably less than about 10 weight %. A particularly useful concentration is that which provides the desired heating while minimizing the concentration of product in the final part.

Another unique application of the present invention combines the stability of the transition metal oxide containing coating, particularly tin oxide, particularly at high temperatures and/or in demanding oxidizing environments, with the need to protect a structural element and/or to provide a fluid, i.e., gas and/or liquid, impervious material. Such structural elements are suitable for use at high temperatures, preferably greater than about 400° F., more preferably greater than about 1500° F. or even greater than about 2000° F. The present coatings preferably provide protection against oxidation. Examples of structural elements requiring such protection and/or a fluid impervious coating include three dimensional substantially carbon or inorganic materials, such as woven ceramic fibers and carbon-carbon composites, useful as turbine engine components, hot air frame components, and hypersonic vehicle structural elements or components. Due to the fact that carbon oxidizes under the demands of such environments, barrier or protective coatings are necessary. A particularly effective barrier coating is a transition metal oxide-containing coating formed according to the present invention because of the high temperature stability and excellent and complete coverage of such coating.

The coating process of this invention, in addition, can uniformly coat three dimensional woven structures, particularly in the various state, to effectively seal off diffusion of gases and/or liquids between surfaces. For example, ceramic fibers, such as those sold under the trademark Nextel by the 3M Company, can be woven into structures or structural elements, sealed off between surfaces, and used in high temperature applications. Such applications include gas and/or oil radiant and post combustion burner tubes, turbine engine components, and combustion chambers. For the latter, such structures can also contain one or more catalytically active materials that promote combustion, such as hydrocarbon combustions.

A particularly unique application that relies upon stable electronic conductivity and the physical durability of the products of this invention are dispersions of conductive material, such as powders, in fluids, e.g., water, hydrocarbons, e.g., mineral or synthetic oils, whereby an increase in viscosity, to even solidification, is obtained when an electrical field is applied to the system. These fluids are referred to as "field dependent" fluids which congeal and which can withstand forces of shear, tension and compression. These fluids revert to a liquid state when the electric field is turned off. Applications include dampening, e.g., shock absorbers, variable speed transmissions, clutch mechanisms, etc.

The products of this invention which can be particularly useful for forming field dependent fluids are particulate as set forth above, particularly as powders. Such particulate can be for example, spheres, fibers, flakes, i.e., platelet, and such other particulates, and powders. Typical examples of such transition metal oxide coated particles are set forth above under catalysts resistance heating and electrostatic and EMI shielding particles. Such particles can have incorporated therein various dopants to modify conductivity and/or other components can be incorporate for a particular property, including various metal type components. In addition, various inorganic substrates are set forth above which substrates are particularly useful in producing the particles for use in field dependent fluids.

The coated substrate including the transition metal oxide, preferably electrorheology electronically conductive transition metal oxide and/or optionally electrorheology polarizable transition metal oxide and/or at least one additional component in an amount effective to promote field dependent fluid performance, is particularly useful as field dependent fluids including electric and magnetic field dependence, particularly electric field. Preferably the additional component is a polarizable component or conductivity modified in an amount effective to promote such fluid performance. Thus the promoting effect of the component may be enhanced by the presence of an electrical field in proximity to the component/particle. Thus, the transition metal oxide, preferably on a substantially non-electronically conductive substrate, e.g., a particle, can provide an effective and efficient electric field dependent fluid, including those which occur or are enhanced when an electric field is applied in proximity of the particle. Thus, it has been found that the presently coated substrates are useful as active electrorheological fluid properties. Without wishing to limit the invention to any particular theory of operation, it is believed that the outstanding stability, e.g., with respect to electronic properties and/or morphology and/or stability, of the present transition metal oxide plays an important role in making useful and effective field dependent particles, particularly the higher surface area attainable tin dioxide particles, particularly when prepared in accordance with this invention.

As noted above, it is preferred that the tin oxide particle, transition metal oxide containing substrates be electronically conductive and/or polarizable. Although doped transition metal oxides are particularly useful, particularly doped tin oxide, other interacting components may be incorporated in the present particle to provide the transition metal oxide with the desired electronic and/or polarizable properties. For example, antimony may be employed for example, as a tin oxide dopant. Such other interacting components may be incorporated into the final particle, transition metal oxide containing coated substrates using one or more processing techniques substantially analogous to procedures useful to incorporate specific dopants, e.g., fluorine as described above.

As set forth above, the transition metal oxide particles are present in the fluid in the amount to enhance the field dependent fluid performance. In addition, the conductivity and/or reciprocal resistivity of the transition metal oxide particle is of a value which promotes the overall performance of the field dependent fluid, i.e., enhances electrorheological properties of the fluid. Typically the resistivity of the tin dioxide particle is within the range from about $10^3$ to about $10^9$ ohm cm, more preferably from about $10^1$ to about $10^3$ ohm cm and still more preferably, from about 10 ohm cm to about $10^2$ ohm cm. The conductivity of the transition metal oxide particle can be controlled by the type of dopant, the concentration of dopant, the processing conditions in order to obtain a resistivity within the preferred ranges as set forth above and with improved electrorheological modifying properties. In addition to the above modifications to obtain a given conductivity other components can be incorporated into the transition metal oxide coating such as a moderate to high resistance type of material such as silica which produces a transition metal oxide coating having optimized eletrorheological properties.

In addition to electrical conductivity as set froth above, the polarizability of the transition metal oxide coating can be modified through the addition of a component such as to enhance the overall polarizability of the transition metal oxide particle which enhanced polarizatiliby can improve the overall electrorheological properties of the fluid. For example, the transition metal oxide coating can be modified to form surface hydrates which are responsive to electric fields and produce a reversible change in electrorheological properties. Other components, particularly polar components, more particularly organic polar components such as surface active agents, alkanol amines such as low molecular weight alkanol amines, alkyl amines and water can in addition be used as polarization components. Such additional components which alter the polarization properties of the transition metal oxide coating and can product field dependent fluids which are useful at elevated temperatures, including for certain fluids use above 70° C. or even above 100° C.

The stability and durability for the present transition metal oxide materials are believed to make them very useful in field dependent fluids in more aggressive and/or more harsh environments, particularly high temperature, and/or pressure and/or oxidation environments.

Certain metal components associated with the transition metal oxide particle may be employed, provided that they function to enhance electrorheological properties and/or an application defined property. Among the useful metal components are those selected from components of the transition metals, the rare earth metals, certain other components and mixtures thereof, in particular, gold, silver, copper, vanadium, chromium, cobalt molybdenum, tungsten zinc, indium, the platinum group metals, i.e., platinum, palladium and thorium, iron, nickel, manganese, cesium, titanium, etc. Although metal containing compounds may be employed, it is preferred that the metal components included with the coated substrate comprise elemental metal and/or metal in one or more active oxidized forms, for example, $Cr_2O_3$, $Ag_2O$, etc.

The preferred substrate materials include a wide variety of inorganic materials including high surface area materials, particularly inorganic oxides and carbon as set forth above, particularly under the catalysts resistance heating and shielding products of this invention. Additional substrates include for example, alumina, silica, zirconia, magnesia, boria, phosphate, titania, ceria, thoria and the like, as well as multi-oxide type supports such as aluminaphosphorous oxide, silica alumina, zeolites, zeolite modified inorganic oxides, e.g., silica alumina and the like. As set forth above, substrate particle materials can be in many forms and shapes, especially shapes which are not flat surfaces, i.e., non line-of-site particulate materials and particularly, spheres. The substrate can be used as is or further processed such as by sintering of powered materials into large aggregates. The aggregates can incorporate other powders, for example, other oxides, to form the aggregates.

As set forth above, the particles include for example, spheres, fibers, flakes, other irregularly shaped geometry such as aggregates and alike. In general the particle size can vary over a wide range, typically a particle size maximum width of from about 0.04 microns up to a width representing about 10% of the design gap between electrodes which form the electric field means associated with the use of the field dependent fluid. More preferably, the range of the width of the particle is from about 1 to about 100 microns still more preferably, from about 5 to about 50 microns. The width of the particles can be adjusted to provide various degrees of packing densities in the fluid which packing densities can include a bi-modal type of distribution of particle sizes.

It is preferred that the particles comprise a majority of mono particles, more preferably, a predominant proportion. The use of mono particles reduces the tendency of the particles to sheer down to smaller size particles which shear down may accompany the use of particle aggregates in field dependent fluids. In addition, it is preferred to have a particle aspect ratio, i.e., the maximum particle width divided by the minimum particle width of less than about 20 to 1, still more preferably less than about 10 to 1 and still more preferably, less than about 5 to 1. One of the preferred shapes is spheres wherein the aspect ratio approaches 1 and/or is 1. In practice the spherical particles which are preferred for use in the composition of this invention, have a roundness associated with such particles generally greater than about 70%, still more preferably greater than about 85% and still more preferably, greater than about 95%.

As set forth above, a particularly preferred particle is a spherical particle, particularly spheres within the particle size and roundness ranges set forth above. The spheres can improve overall field dependent fluid performance, particularly in reducing adverse particle effects on the fluid such as dielectric breakdown. A particularly unique embodiment of the present invention is the use of hollow spheres, particularly within the particle size and roundness ranges as set forth above. Such spheres are hollow i.e. contain one or more closed cell voids hereinafter referred to as hollow spheres and are designed to be density compatible with the fluid. The density compatible hollow spheres have a density in the range of from about 60% to about 140% of the density of the fluid, more preferably from about 70% to about 130% of the density of the fluid, still more preferably from about 80% to about 120% of the density of the fluid and still more preferably, from about 90% to about 110% of the density of the fluid. Thus, for example, the density of the fluid can vary according to the type of fluid utilized in the field dependent fluid, such as from about 0.95 g per cc up to about 1.95 g per cc for certain chlorinated aromatic fluids. The density compatibility of the hollow spheres relates to the particular fluid, including blends of fluids utilized as the field dependent fluid. The density compatibility provides improved stability of the hollow spheres particulate in the fluid, particularly where settling out the particles can adversely effect overall performance of the field dependent fluids and/or where such sedimentation can cause premature failure of the device.

As set forth above, the spheres can be inorganic and for example, carbon and/or inorganic oxide. The preferred inorganic oxides can be for example alumino silicates, silica, sodium borosilicate, insoluble glass, soda lime glass, soda lime borosilicate glass, silica alumina, as well as such glasses and ceramics, modified with titanium dioxide and/or small amounts of iron oxide. The density of the hollow spheres can be designed to be density compatible with the fluid by the density of the inorganic material itself, the hollow and or void volume and the thickness of the wall and the density of surface component on the sphere. For a hollow sphere the aspect ratio, i.e., the diameter of the sphere divided by the thickness of the wall, in part defines both the density of the hollow sphere, as well as the buckling pressure of the sphere. Thus as the aspect ratio decreases, the density of the hollow sphere increases and in general, the crush strength of the hollow sphere increases. Of additional significance is the ability of the hollow sphere under high sheer conditions to provide improved mechanical stability, particularly at aspect ratios which provide the requisite wall thickness and density compatibility. Thus for example, hollow spheres for use in field dependent fluids can be designed for density compatibility at high crush strengths and sheer rates, for example, less than about 20% and even less than about 10% breakage at isostatic pressures of greater than 6,000 psi, even up to about 60,000 psi.

As set forth above, the unique hollow spheres having fluid density compatibility can be coated with transition metal oxide including such additional components as set forth above. In addition, it has been found that the fluid density designed coated particles can improve the overall performance of materials that have been shown to exhibit an electrorheological effect. Thus for example, fluid density coated compatible hollow spheres can have an electronically conductive and/or polarizable surface component associated therewith, including components which are incorporated during the processing to produce such fluid density compatible materials. For example, alumino silicates, organic polyelectrolytes, organic polyampholytes, organic semiconductors, water, polar organic compounds such as alcohols, amines, amides, polyhydroxy organic compounds and various other surfactant materials which provide a polarizable effect on the surface can be incorporated on the surface of the coated hollow sphere.

The surface area can be optimized for the transition metal oxide coating and/or other components, and/or other conductivity and/or polarizable components, by the selection of starting materials, porosity forming components and their concentration and geometry. Such optimization also takes into consideration the final end use application of the substrate. Porosity can also be increased by directly leaching the preformed substrate within an acid medium, i.e., nitric acid, to selectively remove for example ceramic constituents for example magnesia and alumina. Such leaching cannot only increase porosity but also the surface areas of the substrate. Typical substrate surface areas can range from about 0.1 to about 2 meters square per gram up to about 20 or even up to about 40 or higher meters square per gram, with the higher areas generally resulting from leached and/or coated substrates.

It is generally preferred to have a high surface area in order to optimize activity for a particular application. As set forth above, the surface area can be increased by, for example, leaching and/or by the application of a surface coating such as a wash-coat which provides for a high surface area surface on the substrate. It is preferred to incorporate other active components as set forth above on a high surface area for improved overall effectiveness and activity. As set forth above, it is preferred to have macro pores when a subsequent surface coat is being applied to the substrate. Such subsequent coatings can include, for example, a barrier coat, a wash coat, or the tin oxide coating on the substrate surface.

Other active components may be included with the coated substrate and/or substrate using any one or more of various techniques, e.g., conventional and well known techniques. For example, metal can be included with the coated substrate by impregnation; electrochemical deposition; spray hydrolysis; deposition from a molten salt mixture; thermal decomposition of a metal compound or the like. The amount of a component included is sufficient to perform the desired functions, and varies from application to application.

In addition to the above described applications, zinc oxide is particularly useful in applications which require a large electro mechanical coupling coefficient, such as transducers in surface acoustic wave devices and microwave delay lines and various other acoustic and piezo devices. Such properties also have applications in telephone equipment, strain gauges, acoustic optical devices, i.e., laser deflectors and Fourier transform devices.

The potential applications for superconducting materials include large-scale, passive application such as shields or waveguides, superconductors screen or reflect electromagnetic radiation and uses range from coatings on microwave cavities to shielding against electromagnetic pulses and bearings. Repulsive forces of superconductors excluding magnetic fields provide for noncontact bearings.

In addition, high-current, high-field, applications include magnetic imaging/scientific equipment, such as, Superconducting magnets for nuclear magnetic resonance and imaging spectrometers and particle accelerators; Magnetic separation, such as, magnets used for separation and purification of steel scrap, clays, ore streams, stack gases, and desulfurizing coal.

Magnetic levitation such as high-speed train systems; electromagnetic launch systems which can accelerate objects at high velocity. Possible uses include rapidly repeatable, i.e., earth satellite launching, aircraft catapults, and small guns for military uses.

Other magnet applications include powerful magnets in compact synchrotrons for electronic thin-film lithography, crystal growth, magnetohydrodynamic energy conversion systems, and ship propulsion by superconducting motors or by electromagnetic fields. Other high current high field applications include electric power transmission, such as, transmission cables, carrying more current than conventional conductors without loss. Such conductors must be mechanically rugged and operate under high field and high current conditions; energy storage, such as, large superconducting magnetic coils buried in the ground that can store vast amounts of electrical energy, without power loss, in persistent, circulating currents; load leveling for utilities and as power sources for military systems such as pulsed lasers; generators and motors, such as, low-temperature system operating with liquid helium. Motors can be used in ship propulsion, railway engines, and helicopters.

In the area of electronics; applications include passive devices, such as, high-speed wire interconnects in electronic circuits. digital devises, such as, superconducting components, based on Josephson junctions, to be used as switches or in computer logic and memory. In addition, the potential for hybridized semiconductor/superconductor electronic devices may provide yet unknown applications and devices; sensors, such as, superconducting quantum interference devices, SQUIDs) made from Josephson junctions which are extremely sensitive detectors of electromagnetic signals. Low-temperature SQUIDs are used in biomedical, geophysical, and submarine or airplane detection, infrared and microwave sensors.

Other devices include analog-to-digital convertors, voltage standards, signal processors, microwave mixers, filters, and amplifiers.

The copper oxide coated substrate, such as the 1,2,3 and 1,2,4 copper oxide coated substrate, of the present invention may be, for example, a component itself or a component of a composite together with one or more matrix materials. The composites may be such that the matrix material or materials substantially totally encapsulate or surround the coated substrate, or a portion of the coated substrate may extend away from the matrix material or materials.

The iron oxide/substrate combinations, e.g., the iron oxide coated substrates, of the present invention are useful in other applications as well.

The applications for the spinel ferrites can be grouped into several main categories: main cores, and linear, power, and recording-head applications.

Magnetic-core memories are based on switching small turoidal cores of spinel ferrite between two stable magnetic states. Such core memories are used in applications where ruggedness and reliability are necessary, e.g., military applications.

The linear or low signal applications are those in which the magnetic field in the ferrite is well below the saturation level and the relative magnetic permeability can be considered constant over the operating conditions.

The manganese-zinc-ferrite materials characteristically have higher relative permeabilities, higher saturation magnetization, lower losses, and lower resistivities. Since the ferromagnetic resonance frequency is directly related to the permeability the usual area of application is below 2 MHz.

At low signal levels, ferrite cores are used as transformers, low frequency and pulse transformers, or low energy inductors. As inductors, the manganese-zinc-ferrites find numerous applications in the design of telecommunications equipments where they must provide a specific inductance over specific frequency and temperature ranges. Nickel-zinc-ferrites with lower saturation magnetization, generally lower relative magnetic permeabilities, and lower resistivities ($10^6$.cm), produce ferromagnetic resonance effects at much higher frequencies than the manganese-zinc-ferrites. They find particular application at frequencies from 1 to 70 MHz (46).

By adjustment of the nickel-zinc ratio it is possible to prepare a series of materials covering the relative permeability range of 10–2000. These rods, high frequency power transformers, and pulse transformers. A variety of materials have been developed to serve these applications.

The lower magnetic losses of ferrite materials and its higher resistance (10 ohm.cm) compared with laminated transformer steel permits ferrite cores to be used as the transformer element in high frequency power supplies. Commonly known as switched-mode power supplies, they operate at a frequency of 15–30 khz and offer higher efficiencies and smaller size than comparable laminated steel transformers.

Television and audio applications include yoke rings for the deflection coils for television picture tubes, flyback transformers, and various convergence and pincushion intortion corrections, as well as antenna rods.

Manganese-zinc and nickel-zinc-spinel ferrites are used in magnetic recording heads for duplicating magnetic tapes and the recording of digital information. Most recording heads are fabricated from polycrystalline nickel-zinc-ferrite for operating frequencies of 100 kHz to 2.5 GHz.

The unique properties of hexagonal ferrites are low density, and high coercive force.

The ceramic magnet can be used in d-c permanent magnet motors, especially in automotive applications, such window life, flower, and windshield-wiper motors.

Other grades of barium and strontium ferrite material have been developed for similar applications.

Other applications of hexagonal ferrites are used in self-resonant isolators where the strong magnetocrystalline anisotropy permits a resonator without laded-c magnetic biasing fields.

Hexagonal ferrites are also used as magnetic biasing components in magnetic bubble memories.

Certain of these and other aspects the present invention are set forth in the following description of the accompanying drawing.

BRIEF DESCRIPTION OF THE DRAWINGS

FIG. 6 is a detailed, somewhat schematic illustration of a further embodiment of the heating element of the present invention.

FIG. 7 is a schematic illustration showing an embodiment of the electromagnetic interference shielding element of the present invention in use.

FIG. 8 is a schematic illustration showing an embodiment of the electrostatic dissipation element of the present invention in use.

DETAILED DESCRIPTION OF THE DRAWINGS

Figure 1:
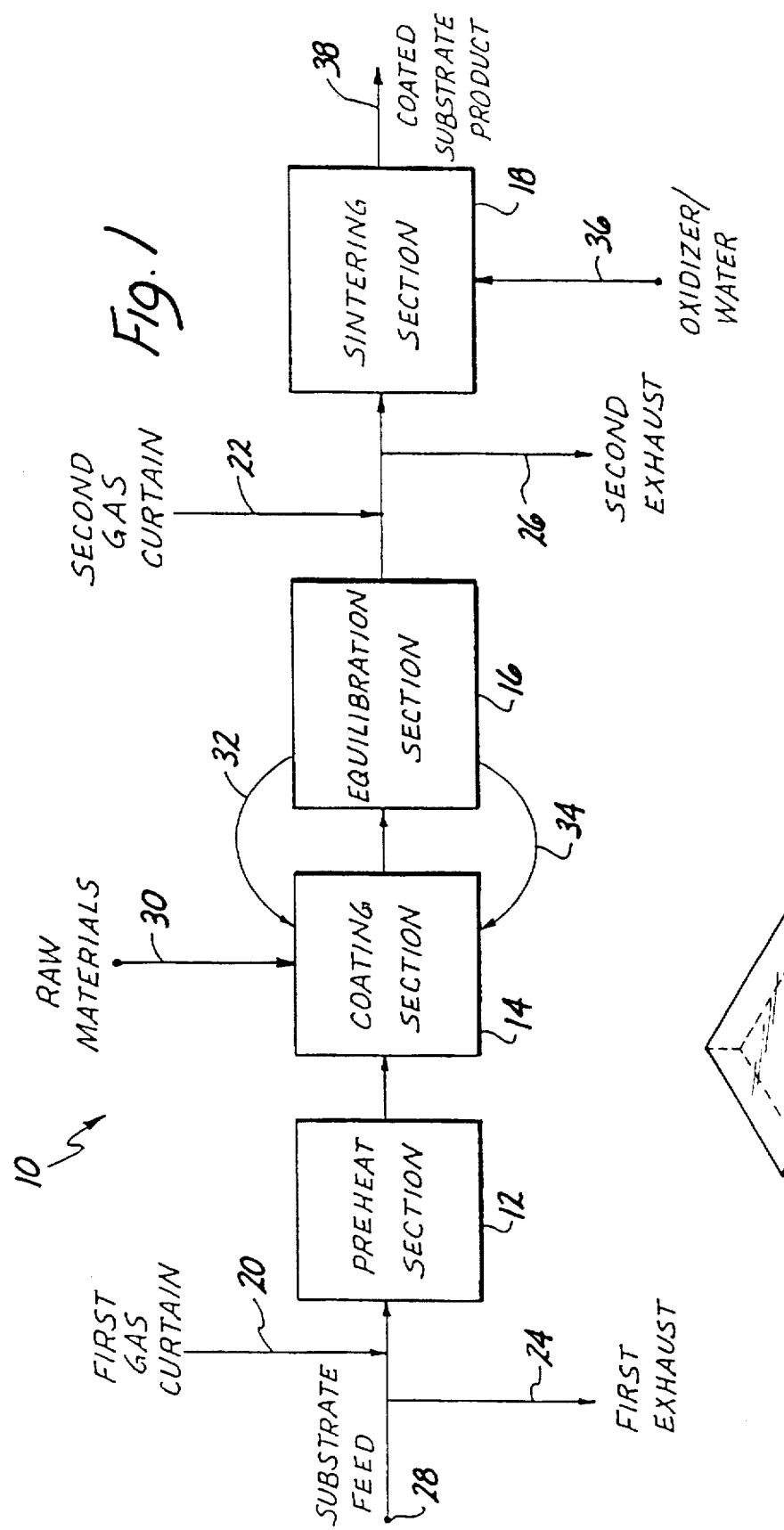
FIG. 1 is a block flow diagram illustrating a process for producing the present coated substrates.

The following description specifically involves the coating of randomly oriented, non-woven mats of C-glass fibers. However, it should be noted that substantially the same process steps can be used to coat other substrate forms and/or materials. Various precursors and ranges of process conditions are set froth in the Examples.

A process system according to the present invention, shown generally at 10, includes a preheat section 12, a coating section 14, an equilibration section 16 and an oxidation/sintering section 18, each of these sections is in fluid communication with the others. Preferably, each of these sections is a separate processing zone or section.

First gas curtain 20 and second gas curtain 22 provide inert gas, preferably nitrogen, at the points indicated, and, thereby effectively insure that preheat section 12, coating section 14 and equilibrium section 16 are maintained in a substantially inert environment. First exhaust 24 and second exhaust 26 are provided to allow vapors to exit or be vented from process system 10.

Randomly oriented woven mats of C-glass fibers from substrate source 28 are fed to preheat section 12 where the mats are preheated up to a maximum of 375° C. for a time of 1 to 3 minutes at atmospheric pressure to reach thermal equilibrium. These mats are composed of from 8 micron to 35 micron diameter C- or T-glass randomly oriented or woven fibers. The mats are up to 42 inches wide and between 0.058 to 0.174 mil thick. The mats are fed to process system 10 at the rate of about 1 to 5 feet per minute so that the fiber weight through is about 0.141 to about 2.1 pounds per minute.

The preheated mats pass to the coating section 14 where the mats are contacted for example with an hydrous mixture of 70% to 95% by weight of stannous chloride and 5% to 30% by weight of stannous fluoride from raw material source 30. This contacting effects a coating of this mixture on the mats.

This contacting may occur in a number of different ways. For example, the $SnCl_2/SnF_2$ mixture can be combined with nitrogen to form a vapor which is at a temperature of from about 25° C. to about 150° C. higher than the temperature of the mats in the coating section 14. As this vapor is brought into contact with the mats, the temperature differential between the mats and the vapor and the amount of the mixture in the vapor are such as to cause controlled amounts of $SnCl_2$ and $SnF_2$ to condense on and coat the mats.

Another approach is to apply the $SnCl_2/SnF_2$ mixture in a molten form directly to the mats in an inert atmosphere. There are several alternatives for continuously applying the molten mixture to the mats. Obtaining substantially uniform distribution of the mixture on the mats ia a key objective. For example, the mats can be compressed between two fillers that are continuously coated with the molten mixture. Another option is to spray the molten mixture onto the mats. The fiber mats may also be dipped directly into the melt. The dipped fiber mats may be subjected to a compression roller step, a vertical lift step and/or a vacuum filtration step to remove excess molten mixture from the fiber mats.

An additional alternative is to apply the $SnCl_2/SnFn_2$ in an organic solvent. The solvent is then evaporated, leaving a substantially uniform coating of $SnCl_2/SnF_2$ on the fiber mats. The solvent needs to be substantially none-reactive (at the conditions of the present process) and provide for substantial solubility of $SnCl_2$ and $SnF_2$. For example, the dipping solution involved should preferably be at least about 0.1 molar in $SnCl_2/$ Substantially anhydrous solvents comprising acetonitrile, ethyl acetate, dimethyl sulfoxide, propylene carbonate and mixtures thereof are suitable. Stannous fluoride is often less soluble in organic solvents than is stannous chloride. One approach to overcoming this relative insolubility of $SnF_2$ is to introduce $SnF_2$ onto the fiber mats after the fiber mats are dipped into the $SnCl_2$ solution with organic solvent. Although the dopant may be introduced in the sintering section 18, it is preferred to incorporate the dopant in the coating section 14 or the equilibration section 16, more preferably the coating section 14.

Any part of process system 10 that is exposed to $SnCl_2$ and/or $SnF_2$ melt or vapor is preferably corrosion resistant, more preferably lined with inert refractory material.

In any event, the mats in the coating section 14 are at a temperature of up to about 375° C., and this section is operated at slightly less than atmospheric pressure. If the $SnCl_2/SnF_2$ coating is applied as a molten melt between compression rollers, it is preferred that such compression rollers remain in contact with the fiber mats for about 0.1 to about 2 minutes, more preferably about 1 to about 2 minutes.

After the $SnCl_2/SnF_2$ coating is applied to the fiber mats, the fiber mats are passed to the equilibration section 16. Here, the coated fiber mats are maintained, preferably at a higher temperature than in coating section 14, in a substantially inert atmosphere for a period of time, preferably up to about 10 minutes, to allow the coating to more uniformly distribute over the fibers. In addition, if the fluorine component is introduced onto the fiber mats separate from the stannous chloride, the time the coated fiber mats spend in the equilibration section 16 results in the dopant component becoming more uniformly dispersed or distributed throughout the stannous chloride coating. Further, it is preferred that any vapor and/or liquid which separate from the coated fiber mats in the equilibration section 16 be transferred back and used in the coating section 14. This preferred option, illustrated schematically in FIG. 1 by lines 32 (for the vapor) and 34 (for the liquid) increases the effective overall utilization of $SnCl_2$ and $SnF_2$ in the process so that losses of these components, as well as other materials such as solvents, are reduced.

The coated fiber mats are passed from the equilibration zone 16 into the sintering zone 18 where such fiber mats are contacted with an oxidizer, such as an oxygen-containing gas, from line 36. The oxidizer preferably comprises a mixture of air and water vapor. This mixture, which preferably includes about 1% to about 50% m more preferably about 15% to about 35%, by weight of water, is contacted with the coated fiber mats at atmospheric pressure at a temperature of about 400° C. to about 550° C. for up to about 10 minutes. Such contacting results in converting the coating on the fiber mats to a fluorine doped transition metal dioxide coating. The fluorine doped transition metal oxide coated fiber mats product, which exits sintering section 18 via line 38, has useful electric conductivity properties. This product preferably has a doped transition metal oxide coating having a thickness in the range of about 0.5 microns to about 1 micron, and is particularly useful as a component in a lead-acid battery. Preferably, the product is substantially free of metals contamination which is detrimental to electrical conductivity.

The present process provides substantial benefits. For example, the product produced as set forth above has a fluorine doped transition metal oxide coating which has useful properties, e.g., outstanding electrical and/or morphological properties. This product may be employed in a lead-acid battery or in combination with a metallic catalyst to promote chemical reactions, e.g., chemical reductions, or alone or in combination with a metallic sensing component to provide sensors, e.g., gas sensors. High utilization of stannous chloride and fluorine components is achieved. In addition, high coating deposition and product throughout rates are obtained. Moreover, relatively mild conditions are employed. For example, temperatures within sintering section 19 can be significantly less than 600° C. The product obtained has excellent stability and durability.

Figure 2:
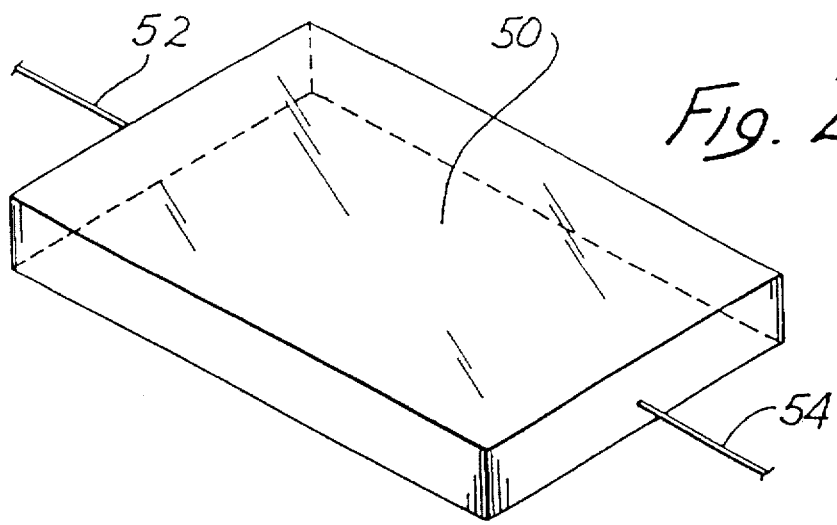
FIG. 2 is a schematic illustration showing an embodiment of the resistance heating element of the present invention.
Figure 3:
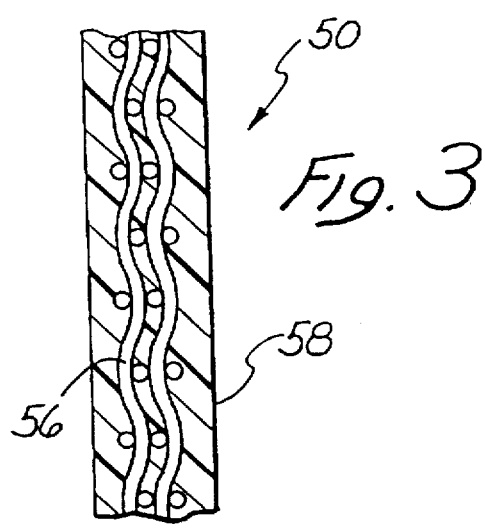
FIG. 3 is a detailed, somewhat schematic illustration of a portion of the resistance heating element shown in FIG. 2.
Figure 4:
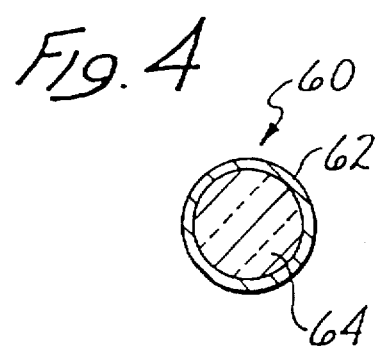
FIG. 4 is a blown-up, cross-sectional view of an individual coated fiber of the coated substrate shown in FIG. 3.

In FIG. 2, a resistance heating element 50 is shown. Element 50 is schematically shown connected to electrical wires 52 and 54 so that an electrical potential can be applied across element 50, in particular across the coated substrate 56 of element 50. Referring to FIG. 3, element 50 is a flexible composite of a coated substrate 56 and a flexible, thermoplastic organic polymeric material 58. Coated substrate 56 is in the form of a glass fiber roving, a three dimensional substrate, and provides an electronically conductive path or network in element 50. As shown in FIG. 4, the individual coated fibers, illustrated by coated fiber 60, of coated substrate 56, are coated with a coating containing electronically conductive transition metal oxide, illustrated by coating 62 on glass fiber 64.

Figure 5:
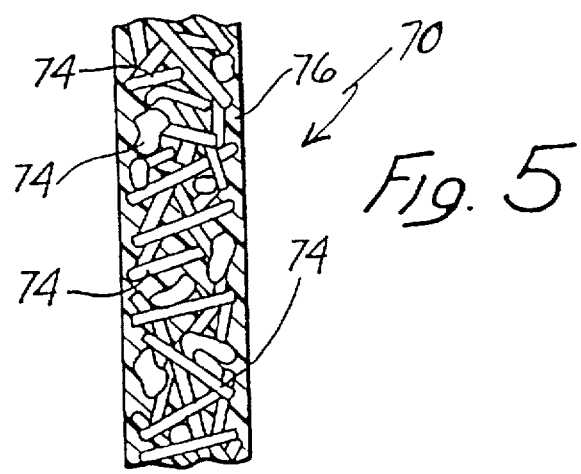
FIG. 5 is a detailed, somewhat schematic illustration of an alternate embodiment of the resistance heating element of the present invention.

Referring to FIG. 5, an alternate resistance heating element 70 is shown. Alternate element 70 can be used in place of element 50 in FIG. 2. Alternate element 70 is a flexible composite of coated substrate particles 74 oriented to provide an electrically conductive path or network in alternate element 70, and a flexible, thermoplastic polymeric matrix material 76. Coated substrate particles 74 are three dimensional particles of various sizes and shapes and are coated with a coating containing electronically conductive transition metal oxide. In cross section, each of these particles 74 looks much like individual fiber 60 in FIG. 4.

In FIG. 6, a further heating element 80 is shown. Further element 80 is shown in contact with electrical wire 82 which runs along the underside of element 80. Further element has substantially the same structure as element 50. As alternating electrical current is passed through electrical wire 82, and an alternating magnetic field is created in further element 80. This field gives rise to small scale current loops, known as eddy currents which act to heat the further element 80 resistively. The configuration shown in FIG. 6 is one embodiment of an inductive heating element in accordance with the present invention.

In FIG. 7, an electromagnetic shielding element 150 is shown in use providing electromagnetic interference shielding for first component 152. That is, element 150 is in shielding relation to first component 152 relative to an electromagnetic interference source 154. In particular, element 150 is located between first component 152 and source 154. Element 150 and first component 152 may be parts of the same device, for example, element 150 being a housing for first component 152. Further, element 150 can act upon first component 152 in a shielding relation when first component 152 is a source of electromagnetic interference.

Electromagnetic shielding element 150 is a flexible composite of a coated substrate and a flexible, thermoplastic organic polymeric material. Electromagnetic shielding element 150 is structured similarly to resistance heating element 50, as shown in FIGS. 3 and 4.

In FIG. 8, an electrostatic dissipation element 170 is shown in use in contact with second component 172 to provide for dissipation of electrostatic energy. As is conventional, element 170 is grounded. Element 170 and second component 172 may be parts of the same article.

Electrostatic dissipation element 170 is a flexible composite of coated substrate particles oriented to provide an electrically conductive path or network in element 170, and a flexible, thermoplastic polymeric matrix material. Electrostatic dissipation element 170 is structured similarly to alternate resistance heating element 70, as shown in FIGS. 4 and 5.

It should be noted that electromagnetic shielding element 150 can be structured as electrostatic dissipation element 170 is structured and vice versa.

EXAMPLE 1

A substrate made of C-glass was contacted with a molten mixture containing 30 mol % $SnF_2$ and 70 mol % $SnCl_2$.

This contacting occurred at 350° C. in an argon atmosphere at about atmospheric pressure and resulted in a coating containing $SnCl_2$ and $SnF_2$ being placed on the substrate.

This coated substrate was then heated to 375° C. and allowed to stand in an argon atmosphere at about atmospheric pressure for about 5 minutes. The coated substrate was then fired at 500° C. for 20 minutes using flowing, at the rate of one (1) liter per minute, water saturated air at about atmospheric pressure. This resulted in a substrate having a fluorine doped transition metal oxide coating with excellent electronic properties. For example, the volume resistivity of this material was determined to be $7.5 \times 10^{-4}$ ohm-cm.

In the previously noted publication "Preparation of Thick Crystalline Films of Transition metal Oxide and Porous Glass Partially Filled with Transition metal Oxide," an attempt to produce antimony doped transition metal oxide films on a 96% silica glass substrate involving stannous chloride oxidation at anhydrous conditions resulted in a material having a volume resistivity of $1.5 \times 10^{-7}$ ohm-cm.

The present methods and products, illustrated above, provide outstanding advantages. For example, the fluorine doped tin oxide coated substrate prepared in accordance with the present invention has improved, i.e., reduced, electronic resistivity, relative to substrates produced by prior methods.

EXAMPLE 2

Stannous chloride powder is applied to a 26 inches by 26 inch glass fiber non-woven mat in the form of a powder (10 to 125 microns in average particle diameter)i shaken from a powder spreading apparatus positioned 2 to about 5 feet above the mat. An amount of stannous fluorine powder (10 to about 125 microns in average particle diameter) is added directly to the stannous chloride powder to provide fluoride dopant for the final transition metal oxide product. The preferred range to achieve low resistance transition metal oxide products is about 15% to about 20% by weight of stannous fluoride, based on the total weight of the powder. The powder-containing mat is placed into a coating furnace chamber at 350° C. and maintained at this temperature for approximately 20 minutes. During this time, a downflow of 9.0 liters per minute of nitrogen heated to 350° C. to 350° C. is maintained in the chamber.

In the coating chamber the stannous chloride powder melts and wicks along the fiber to from a uniform coating. In addition, a small cloud of stannous chloride vapor can form above the mat. This is due to a small refluxing action in which hot stannous chloride vapors rise slightly and are then forced back down into the mat for coating and distribution by the nitrogen downflow. This wicking and/or refluxing is believed to aid in the uniform distribution of stannous chloride in the coating chamber.

The mat is when moved into the oxidation chamber. The oxidation step occurs in a molecular oxygen-containing atmosphere at a temperature of 525° C. for a period of time of 10 to 20 minutes. The mat may be coated by this process more than once to achieve thicker coatings.

EXAMPLE 3

Example 2 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 4

Example 2 is repeated except that the powder is applied to the mat by pulling the mat through a fluidized bed of the powder, which is an average particle diameter of about 5 to about 125 microns.

EXAMPLE 5 TO 7

Examples 2, 3 and 4 are repeated except that, prior to contacting with the powder, the mat is charged by passing electrostatically charged air over the mat. The powder particles are charged with an opposite charge to that of the mat. The use of oppositely charged mat and powder acts to assist or enhance the adherence of the powder to the mat.

EXAMPLES 8 TO 13

Examples 2 to 7 are repeated except that no stannous fluoride is included in the powder. Instead, hydrogen fluoride gas is included in the downflow nitrogen gas in the chamber. The preferred weight ratio os tin to fluoride fed to the chamber to achieve low resistance tin oxide products is in the range of about 0.05 to about 0.2.

In each of the Examples 2 to 17, the final coated mat includes an effectively fluoride doped in oxide-containing coating having a substantial degree of uniformity.

EXAMPLES 14 TO 17

Examples 2, 3, 4, 5, 6 and 7 were repeated except that a monolith having a cell density of 30 cells per centimeter squared, made from cordierite was substituted for the glass fabric. The monolith had a porosity of about 30%.

EXAMPLE 18

A substrate made of alumina carbide was contacted with a powder mixture containing 95 mol % $ZnCl_2$ and 5 mol % $SnCl_2$. This contacting occurred at ambient temperature in an air atmosphere at about atmospheric pressure and resulted in a coating containing $ZnCl_2$ and $SnCl_2$ being placed on the substrate.

This coated substrate was then heated to 375° C. and allowed to stand in an argon atmosphere at about atmospheric pressure for about 5 minutes. The coated substrate was then fired at 600° C. for 5 minutes using flowing, at the rate of one (1) liter per minute, water saturated air at about atmospheric pressure followed by 10 minutes sintering at 700° C. This resulted in a substrate having a $SnO_2$ doped zinc oxide coating with excellent electronic properties.

The present methods and products, illustrated above, provide outstanding advantages. For example, the doped zinc oxide coated substrate prepared in accordance with the present invention has improved, i.e., reduced, electronic resistivity, relative to substrates produced by prior methods.

EXAMPLE 19

Zinc chloride powder is applied to a 26 inch by 26 inch silica fiber non woven mat in the form of a powder (10 to 125 microns in average particle diameter) shaken from a powder spreading apparatus positioned 2 to about 5 feet above the mat. An amount of indium mono chloride powder (10 to about 125 microns in average particle diameter) is added directly to the zinc chloride powder to provide a dopant for the final zinc oxide product. The preferred range to achieve low resistance zinc oxide products is about 2% to about 15% by weight of indium chloride, based on the total weight of the powder. The powder-containing mat is placed into a coating furnace chamber at 375° C. and maintained at this temperature for approximately 20 minutes. During this time a downflow of 9.0 liters per minute of nitrogen heated to 350° C. to 450° C. is maintained in the chamber.

In the coating chamber the zinc and indium chloride powder melts and wicks along the fiber to form a uniform coating. In addition, a small cloud of zinc metal chloride vapor can form above the mat. This is due to a small refluxing action in which hot zinc and indium chloride vapors rise slightly and are then forced back down into the mat for coating and distribution by the nitrogen downflow. This wicking and/or refluxing is believed to aid in the uniform distribution of zinc chloride in the coating chamber.

The mat is then moved into the oxidation chamber. The oxidation step occurs in a molecular oxygen-containing atmosphere at a temperature of 525° C. for a period of time of 1 to 5 minutes followed by increasing the temperature to 800° for a period of time of from 10 to 40 minutes in the presence of a sulfur oxide forming source. The mat may be coated by this process more than once to achieve thicker coatings.

EXAMPLE 20

Example 19 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 21

Example 19 is repeated except that the powder is applied to the mat by pulling the mat through a fluidized bed of the powder, which as an average particle diameter of about 5 to about 125 microns.

EXAMPLES 22 TO 24

Examples 19 to 21 are repeated except that no indium chloride is included in the powder. Instead, gallium dichloride gas is included in the downflow nitrogen gas in the chamber. The preferred weight of gallium chloride fed to the chamber to achieve low resistance zinc oxide products is in the range of about 1% to about 4% based on the zinc chloride present on the substrate.

In each of the Examples 18 to 24, the final coated fiber includes an effectively doped zinc oxide-containing coating having a substantial degree of uniformity.

EXAMPLE 25

A substrate made of yttria stabilized zirconia was contacted with a molten mixture containing CuCl, $BaO_2$ and $YCl_3$ in a ratio to provide an atomic ratio of Y, Ba, Cu of 1, 2, 3, or 1, 2, 4, in the final product. This contacting occurred at 350° C. in an argon atmosphere at about atmospheric pressure and resulted in a coating being placed on the substrate.

The coated substrate was then heated to 475° C. and allowed to stand in an argon atmosphere at about atmospheric pressure for about 20 minutes. The coated substrate was then fired at 800° C. for 20 minutes using flowing, at the rate of one (1) liter per minute, water saturated air at about atmospheric pressure.

The material was further annealed at 500° C. for 24 hours. This resulted in a substrate having a copper oxide coating with excellent electronic properties.

The present methods and products, illustrated above, provide outstanding advantages. For example, the copper oxide coated substrates, particularly thin film prepared in accordance with the present invention have improved, i.e., reduced, electronic defects, relative to substrates produced by prior methods.

EXAMPLE 26

Cuprous chloride powder is applied to multiple fibers of alumina (random mat) in the form of a powder (10 to 125 microns in average particle diameter) shaken from a powder spreading apparatus positioned 2 to about 5 feet above the spread multiple filament. An amount of $YCl_3$ and $BaO_2$ powder (10 to about 125 microns in average particle diameter) is added directly to the cuprous chloride powder to provide the necessary stoichiometry for the final copper oxide product. The powder-containing mat is placed into a coating furnace chamber at 450° C. and maintained at this temperature for approximately 20 minutes. During this time a downflow of 9.0 liters per minute of nitrogen heated to 450° C. to 500° C. is maintained in the chamber.

In the coating chamber the cuprous chloride powder melts and wicks along the fiber to form a uniform coating. The $YCl_3$ is in a finely dispersed form from about 0.2 to about 2 micron for ease of wicking. In addition, a small cloud of cuprous chloride vapor can form above the mat. This is due to a small refluxing action in which hot cuprous chloride vapors rise slightly and are then forced back down into the mat for coating and distribution by the nitrogen downflow. This wicking and/or refluxing is believed to aid in the uniform distribution of cuprous chloride and additional components in the coating chamber.

The fiber is then moved into the oxidation chamber. The oxidation step occurs in a molecular oxygen-containing atmosphere at a temperature of 800° C. for a period of time of 1 hour. The fiber may be coated by this process more than once to achieve thicker coatings and/or removed and annealed in a finishing oxidation step to develop the optimum crystal structure for conductivity.

EXAMPLE 27

Example 26 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 28

Example 26 is repeated except that the powder is applied to the fiber by pulling the mat through a fluidized bed of the powder, which as an average particle diameter of about 5 to about 125 microns for meltable components and from about 0.2 to about 2 micron for dispersible compounds.

In each of the Examples 25 to 28, the final coated fiber includes an effective copper oxide-containing coating having a substantial degree of uniformity.

EXAMPLE 29

A substrate made of alumina carbide was contacted with a powder mixture containing 95 mol % $ZnCl_2$ and 5 mol % $SnCl_2$. This contacting occurred at ambient temperature in an air atmosphere at about atmospheric pressure and resulted in a coating containing $ZnCl_2$ and $SnCl_2$ being placed on the substrate.

This coated substrate was then heated to 375° C. and allowed to stand in an argon atmosphere at about atmospheric pressure for about 5 minutes. The coated substrate was then fired at 600° C. for 5 minutes using flowing, at the rate of one (1) liter per minute, water saturated air at about atmospheric pressure followed by 10 minutes sintering at 700° C. This resulted in a substrate having a $SnO_2$ doped iron oxide coating with excellent electronic properties.

The present methods and products, illustrated above, provide outstanding advantages. For example, the doped iron oxide coated substrate prepared in accordance with the present invention has improved, i.e., magnetic properties and offer significant design for a wide variety of applications.

EXAMPLE 30

The powder of example 29 is applied to a 26 inch by 26 inch silica fiber non woven mat in the form of a powder (10 to 125 microns in average particle diameter) shaken from a powder spreading apparatus positioned 2 to about 5 feet above the mat. An amount of indium mono chloride powder (10 to about 125 microns in average particle diameter) is added directly to the iron chloride powder to provide a dopant for the final iron oxide product. The preferred range to achieve low resistance iron oxide products is about 2% to about 15% by weight of indium chloride, based on the total weight of the powder. The powder-containing mat is placed into a coating furnace chamber at 375° C. and maintained at this temperature for approximately 20 minutes. During this time a downflow of 9.0 liters per minute of nitrogen heated to 350° C. to 450° C. is maintained in the chamber.

In the coating chamber the chloride powder melts and wicks along the fiber to form a uniform coating. In addition, a small cloud of iron metal chloride vapor can form above the mat. This is due to a small refluxing action in which hot iron and indium chloride vapors rise slightly and are then forced back down into the mat for coating and distribution by the nitrogen downflow. This wicking and/or refluxing is believed to aid in the uniform distribution of iron chloride in the coating chamber.

The mat is then moved into the oxidation chamber. The oxidation step occurs in a molecular oxygen-containing atmosphere at a temperature of 525° C. for a period of time of 1 to 5 minutes followed by increasing the temperature to 800° for a period of time of from 10 to 40 minutes in the presence of a sulfur oxide forming source. The mat may be coated by this process more than once to achieve thicker coatings.

EXAMPLE 31

Example 30 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 32

Example 30 is repeated except that the powder is applied to the mat by pulling the mat through a fluidized bed of the powder, which as an average particle diameter of about 5 to about 125 microns.

In each of the Examples 29 to 32, the final coated product included an effective iron oxide-containing coating having a substantial degree of uniformity.

EXAMPLE 33

A commercial spray pyrolysis process unit was used to compare the processing of a flat glass soda lime substrate with the processing of a non-woven porous mat of the type set forth in example 1. The spray pyrolysis unit had a process capability to coat a flat glass having a dimension of from 3 feet in width to 5 feet in length. In the unit a solution composition was atomized and sprayed directly at the surface. The temperature of the substrate was obtained by placing the substrate within an electrically heated furnace. The substrate was then removed from the furnace and immediately contacted with the atomized solution spray. The deposition parameters were as follows: temperature 500° C., gas delivery pressure solution 30 psi, compressed air 40–60 psi, spray configuration—round spray, vertical deposition, final coat distance—16" to 18", solution feed rate—5–20 ml per minute, spraying time 30–60 seconds. The spray solution contained 50% stannic chloride, deionized water, methanol and hydrofluoric acid (48 wt %) in a ratio of about 1 to 1 to 1 to 0.1. The following results were obtained from the processing of a flat soda lime glass, and a non-woven C glass mat having a thickness of about 0.65", a dimension of 16"×16" and a bulk porosity of about 90%. Each substrate was processed according to the above conditions and after processing it was determined that the flat glass had a resistivity of 10 ohms per square while the C glass mat had no evidence of a coating. The process was repeated except that that mat was placed in front of the flat glass. After processing, there was no evidence of coating on the C glass mat. However, the backside flat glass had a conductive coating. Following the failure to coat the glass mat, using state of the art, spray pyrolysis technology, the process unit was modified by placing a 1" thick stainless steel plate on which to vertically mount the C glass mat. The mat after processing with the 1" stainless steel backing produced a resistivity of 600–800 ohms per square on the inner surface of the mat. The process unit was again modified to place mesh screens over the front of the mat, accompanied by bolting of the screens to the back of the stainless steel plate. The results of the combination of steel plate and mesh plate over the front of the mat was a mat conductivity of 5–6 ohms per square. However, the mesh plate obstructed the contact of the spray solution with the mesh underlying portions of the glass mat. In order to achieve a conductivity of 5–6 ohms per square, 20 coatings on both the front and back sides were required. The modifications made to the state of the art process unit, were not available in the prior art.

EXAMPLE 34

A horizontal continuous chemical vapor deposition (CVD) furnace manufactured by Watkins-Johnson was evaluated for the coating of the non-woven fabric of Example 1. The furnace is described in Circuits Manufacturing, October 1975. The furnace differs from the spray pyrolysis system of Example 18 by the continuous nature of the furnace and the use of vapor deposition of reactants. The furnace temperature could be profiled to reach approximately 560° C. and has been used to produce transition metal dioxide coated flat glass in one pass. The CVD furnace used tetramethyl transition metal, or stannic chloride as the vaporous transition metal source. The fluoride dopant source used with tetramethyl transition metal was trifluorobromo methane and with stannic chloride was hydrofluoric acid. The oxidant in the CVD furnace was a combination of water (vapor) and methanal. The non-woven mat used to evaluate the state of the art process equipment, was the same non-woven mat used in Examples 1 and 18. The process was evaluated using the highest temperature attainable in the oven using the slowest belt speed and at conditions to maximize reactant deposition and formation of a fluoride doped transition metal dioxide. A series of 25 process runs were made in the furnace and it was determined that essentially no deposition and coating was obtained on the non-woven mat. The same conditions with flat glass produced highly conductive transition metal dioxide coatings on soda lime glass.

EXAMPLE 35

An electrolysis tin oxide deposition method that had been used experimentally on flat surfaces was evaluated for coating non-woven mat of the type set forth in examples 1, 33 and 34. The method was based on the controlled homogenous precipitation of transition metal hydrate hydroxide from an aqueous solution of stannic chloride complexed with ammonium chloride. In the method, a catalyst (silver nitrate) is added in order to initiate precipitation. Precipitation begins when the substrate is immersed and the pH is brought up to 7.5 with sodium hydroxide. The results obtained when a non-woven fabric was utilized in the process were very low deposition rates, poor materials utilization, poor coating adhesion, poor fiber coating, i.e., clumps, poor continuity of the fiber, very low to zero dopant incorporation and a very high resistivity transition metal oxide.

The results set forth in examples 33, 34 and 35 demonstrate the difficult and substantial problems associated with the coating of shielded surfaces and/or 3-D type substrates. In examples 33 and 34, the substitution of a 3-dimensional, non-woven fabric for a flat glass substrate in units which are used to effectively coat flat glass were unsuccessful in their application to a 3-dimensional substrates and/or substrates with shielded surfaces. In addition, example 35 demonstrates the difficulty in processing 3-D substrates, i.e., very high resistivity and in addition, the difficult problem of incorporation of a dopant to provide enhanced electrical conductivity. A comparison between example 1 and examples 33, 34 and 35 demonstrate the unexpected, unique advantages and advances of the processes of this invention and the unique products for use in a wide variety of applications.

While this invention has been described with respect to various specific examples and embodiments, it is to be understood that the invention is not limited thereto and that it can be variously practiced within the scope of the following claims.

What is claimed is:

1. An article comprising a three-dimensional inorganic particulate substrate and at least one of an electrically conductive or magnetic interacting component containing transition metal oxide containing coating on at least a portion of all three dimensions of said substrate, said substrate including external surfaces and shielded surfaces which are at least partially shielded by other portions of said substrate and having at least one of the electronically conductive or magnetic transition metal oxide containing coating on at least a portion of said external surfaces and said shielded surfaces, provided that said substrate has substantially nonelectronically conductive and nonmagnetic properties derived from a transition metal oxide contained in said substrate which is the same as the transition metal oxide of the coating; said coating being formed from the oxidation of a liquidus transition metal oxide precursor on said substrate, said coated substrate being adapted for use, alone or in combination with one or more articles or elements selected from the group consisting of an inorganic matrix element, an organic matrix element, a porous polymer matrix element, a porous inorganic matrix element, a fluid matrix element, a structural element, a catalyst component element, a porous membrane element, an electrostatic dissipation element, an electromagnetic interference shielding element, a heating element and a mechanical electrical element.

2. The article of claim 1 wherein the article is adapted for use as an electrostatic-dissipation/electromagnetic interference shielding element.

3. The article of claim 2 wherein a matrix material is in contact with said coated substrate.

4. The article of claim 3 wherein said matrix material is an organic polymer material.

5. The article of claim 4 wherein said coated substrate is in a form selected from the group consisting of spheres, flakes, irregularly shaped particles, fibers, and porous substrates.

6. The article of claim 1 wherein the article is adapted for use as a heating element.

7. The article of claim 6 wherein said coated substrate is in a form selected from the group consisting of spheres, extrudes, flakes, single fibers, chopped fibers, porous substrates, irregular shaped particles and multi-channel monoliths.

8. The article of claim 7 wherein said coated substrate is in the form of a multi-channel monolith.

9. The article of claim 1 wherein the article is adapted for use as a catalyst element.

10. The article of claim 9 wherein the substrate is selected from the group consisting of a porous substrate and a monolith.

11. The article of claim 10 wherein said catalyst element includes at least one catalyst metal selected from the group consisting of gold, silver, copper, vanadium, chromium, tungsten, zinc, indium, antimony, the platinum group metals, iron, nickel, manganese, cesium and titanium.

12. An article comprising at least one of an electrically conductive or magnetic transition metal oxide coated inorganic three dimensional substrate produced by a process comprising:

contacting said inorganic three dimensional substrate which includes external surfaces and shielded surfaces which are at least partially shielded by other portions of said substrate with a composition comprising a transition metal oxide forming compound having a melting point of from about 100° C. to about 650° C. at conditions effective to form a transition metal oxide forming compound containing coating on at least a portion of said three dimensional substrate, including at least a portion of the shielded surfaces of said substrate; forming a liquidus coating from said transition metal oxide forming compound on at least a portion of the three dimensions of said substrate including the shielded surfaces of said substrate under substantially nondeleterious conditions effective to do at least one of the following: (1) coat a larger portion of said substrate with the said transition metal oxide forming compound coating; (2) distribute said transition metal oxide forming compound coating over said substrate; and (3) make the transition metal oxide forming compound coating more uniform in thickness, contacting said substrate having liquidus transition metal oxide forming compound containing coating thereon with an oxidizing agent at conditions effective to convert the transition metal oxide forming compound to a transition metal oxide and form a transition metal oxide on at least a portion of said three dimensions of said coated substrate including the shield surfaces and recovering at least one of an electrically conductive or magnetic transition metal oxide coated three dimensional substrate, provided that said substrate has substantially nonelectronically conductive and nonmagnetic properties derived from a transition metal oxide contained in said substrate which is the same as the transition metal oxide of the coating.

13. The article of claim 12 wherein the transition metal of said transition metal oxide is selected from the group consisting of chromium, tungsten, indium, molybdenum, titanium and mixtures thereof.

14. The article of claim 12 wherein said transition metal oxide forming compound is selected from the group consisting of a transition metal chloride, a transition metal organic salt, a transition metal organic complex and mixtures thereof.

15. The article of claim 14 wherein said transition metal oxide forming compound is a transition metal chloride.

16. The article of claim 15 wherein said substrate is an inorganic oxide and in a form selected from the group consisting of spheres, extrudates, flakes, fibers, porous substrates, irregularly shaped particles and multi-channel monoliths.

17. The article of claim 12 wherein said substrate is contacted with an additional coating property modifying interacting component in any one or more of said process steps and forming a coated substrate having one or more interacting components on at least a portion of said substrate including at least a portion of the shielded surfaces of said substrate.

18. The article of claim 17 wherein said substrate is an inorganic oxide and in a form selected from the group consisting of spheres, extrudates, flakes, fibers, fiber rovings, chopped fibers, fiber mats, porous substrates, irregularly shaped particles and multi-channel monoliths.

19. The article of claim 12 wherein the substrate is an inorganic oxide and the thickness of the coating is in the range of from about 0.1 micron to about 10 microns.

20. The article of claim 19 wherein said substrate is in a form selected from the group consisting of spheres, extrudates, flakes, fibers, fiber rovings, chopped fibers, fiber mats, porous substrates, irregularly shaped particles and multi-channel monoliths.

21. The article of claim 12 wherein said substrate is in a form selected from the group consisting of spheres, extrudates, flakes, fibers, fiber rovings, chopped fibers, fiber mats, porous substrates, irregularly shaped particles and multi-channel monoliths.

22. An article comprising at least one of an electrically conductive or magnetic transition metal oxide coated inorganic three dimensional substrate produced by a process comprising; contacting said inorganic three dimensional substrate which includes external surfaces and shielded surfaces which are at least partially shielded by other portions of said substrates, with a composition comprising a transition metal oxide precursor powder at conditions effective to form a coating containing transition metal oxide precursor on at least a portion of the substrate; forming a liquidus coating from said transition metal oxide precursor on at least a portion of the three dimensions of said substrate including the shielded surfaces of said substrate and at conditions effective to do at least one of the following: (1) coat a larger portion of said substrate with said coating; (2) distribute said coating over said substrate; and (3) make said coating more uniform in thickness and contacting said liquidus coated substrate with an oxidizing agent at conditions effective to convert the coating to a transition metal oxide and form a transition metal oxide coating on at least a portion of said three dimensions of said substrate including shielded surfaces and recovering at least one of an electrically conductive or magnetic transition metal oxide coated three dimensional substrate, provided that said substrate has substantially nonelectronically conductive and nonmagnetic properties derived from a transition metal oxide contained in said substrate which is the same as the transition metal oxide of the coating.

23. The article of claim 22 wherein the transition metal of said transition metal oxide is selected from the group consisting of chromium, tungsten, indium, molybdenum, titanium and mixtures thereof.

24. The article of claim 22 wherein said transition metal oxide precursor powder is selected from the group consisting of a transition metal chloride, a transition metal organic salt, a transition metal organic complex and mixtures thereof.

25. The article of claim 22 wherein said transition metal oxide precursor powder is a transition metal chloride.

26. The process of claim 22 wherein said substrate is contacted with an additional coating property modifying interacting component in any one or more of said process steps and forming a coated substrate having one or more interacting components on at least a portion of said substrate including at least a portion of the shielded surfaces of said substrate.

27. The article of claim 26 wherein said substrate is an inorganic and in a form selected from the group consisting of spheres, extrudates, flakes, fibers, fiber rovings, chopped fibers, fiber mats, porous substrates, irregularly shaped particles and multi-channel monoliths.

28. The article of claim 26 wherein any one or more of said contacting steps and forming steps are conducted under at least one or both of said precursor powder and said substrate being fluidized.

29. The article of claim 26 wherein the substrate is an inorganic oxide and in a form selected from the group consisting of spheres, extrudates, flakes, fibers, porous substrates, and irregularly shaped particles and the transition metal oxide forming compound is a transition metal chloride.

30. The article of claim 26 wherein said substrate is in a form selected from the group consisting of spheres, extrudates, flakes, fibers, fiber rovings, chopped fibers, fiber mats, porous substrates, irregularly shaped particles and multi-channel monoliths.

31. The article of claim 22 wherein any one or more of said contacting steps and forming steps are conducted under at least one or both of said precursor powder and said substrate being fluidized.

* * * * *